United States Patent
Su et al.

(10) Patent No.: US 12,137,374 B2
(45) Date of Patent: Nov. 5, 2024

(54) INTENT DECOMPOSITION METHOD AND APPARATUS

(71) Applicant: HUAWEI TECHNOLOGIES CO., LTD., Shenzhen (CN)

(72) Inventors: Qi Su, Shanghai (CN); Yan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 330 days.

(21) Appl. No.: 17/809,767

(22) Filed: Jun. 29, 2022

(65) Prior Publication Data

US 2022/0330092 A1 Oct. 13, 2022

Related U.S. Application Data

(63) Continuation of application No. PCT/CN2019/130175, filed on Dec. 30, 2019.

(51) Int. Cl.
*H04W 28/08* (2023.01)
*H04L 41/00* (2022.01)
(Continued)

(52) U.S. Cl.
CPC ... *H04W 28/0862* (2023.05); *H04W 28/0942* (2020.05)

(58) Field of Classification Search
CPC .......... H04W 28/0862; H04W 28/0942; H04L 41/00; H04L 41/0869; H04L 43/08
See application file for complete search history.

(56) References Cited

U.S. PATENT DOCUMENTS 7,970,746 B2 * 6/2011 Seshadri ................. H04L 63/20
707/694
10,187,321 B2 * 1/2019 Maino ................. H04L 43/0882
(Continued)

FOREIGN PATENT DOCUMENTS

CN 107852365 A 3/2018
CN 108777633 A 11/2018
(Continued)

OTHER PUBLICATIONS

Extended European Search Report issued in corresponding European Application No. 19958102.6, dated Nov. 30, 2022, pp. 1-10.
(Continued)

*Primary Examiner* — Ahmed Elallam
(74) *Attorney, Agent, or Firm* — HAUPTMAN HAM, LLP

(57) ABSTRACT

An intent decomposition method includes sending, by a first network device, a first sub-intent target value to a second network device. The method also includes receiving, by the first network device, a first message from the second network device. The first message is used to indicate that the first sub-intent target value is not achieved by the second device. The first message includes a first measurement value of the second network device. The method further includes re-decomposing, by the first network device, an intent based on the first measurement value, and sending first sub-intent target values obtained through re-decomposition to the second network device and one or more other network devices different from the first network device and the second network device until all the first sub-intent target values obtained through re-decomposition are achieved or none of the first sub-intent target values obtained through re-decomposition are achieved.

20 Claims, 11 Drawing Sheets

(51) Int. Cl.
*H04L 41/0869* (2022.01)
*H04W 28/086* (2023.01)
*H04L 43/08* (2022.01)

(56) References Cited

U.S. PATENT DOCUMENTS

| | | | |
|---|---|---|---|
| 10,567,384 B2* | 2/2020 | Kang | H04L 41/0894 |
| 11,133,953 B2* | 9/2021 | Shive | G06N 5/04 |
| 11,716,256 B2* | 8/2023 | Li | H04W 48/18 |
| | | | 709/224 |
| 11,831,520 B2* | 11/2023 | Pasupathy | H04L 41/40 |
| 2019/0068598 A1* | 2/2019 | Kang | H04L 63/20 |
| 2019/0109768 A1 | 4/2019 | Senarath et al. | |
| 2019/0182220 A1 | 6/2019 | Resch et al. | |
| 2023/0125626 A1* | 4/2023 | Vanbrabant | G06F 9/45558 |
| | | | 718/1 |

FOREIGN PATENT DOCUMENTS

| | | | | |
|---|---|---|---|---|
| CN | 110098950 | A | | 8/2019 |
| CN | 110166305 | A | | 8/2019 |
| CN | 110868315 | B | * | 11/2022 ......... H04L 41/0803 |
| EP | 2035949 | A1 | | 3/2009 |
| EP | 3338414 | A1 | | 6/2018 |
| WO | 2007145680 | A1 | | 12/2007 |
| WO | 2017031305 | A1 | | 2/2017 |

OTHER PUBLICATIONS

3GPP TR 28.812 V0.8.0 (Oct. 2019), 3rd Generation Partnership Project; Technical Specification Group Services and System Aspects; Telecommunication management; Study on scenarios for Intent driven management services for mobile networks (Release 16), 41 pages.

3GPP TS 32.401 V15.0.0 (Jun. 2018), 3rd Generation Partnership Project; Technical Specification Group Services and System Aspects; Telecommunication management; Performance Management (PM); Concept and requirements (Release 15), 29 pages.

International Search Report issued in corresponding International Application No. PCT/CN2019/130175, dated Jul. 30, 2020, pp. 1-10.

* cited by examiner

INTENT DECOMPOSITION METHOD AND APPARATUS

CROSS-REFERENCE TO RELATED APPLICATIONS

This application is a continuation of International Patent Application No. PCT/CN2019/130175, filed on Dec. 30, 2019, the disclosure of which is hereby incorporated by reference in its entirety.

TECHNICAL FIELD

This application relates to the field of wireless communication technologies, and in particular, to an intent decomposition method and an apparatus.

BACKGROUND

In an intent decomposition scenario, an intent system receives a total intent target value, and decomposes the total intent target value into a plurality of sub-intent target values. The plurality of sub-intent target values satisfy the total intent target value. The intent system delivers the sub-intent target values to a low-level intent system, obtains network states of intent operation objects in the low-level intent system, and determines achievement statuses of the sub-intent target values. Based on the achievement statuses of the sub-intent targets, the intent system re-decomposes the total intent target value and re-delivers new sub-intent target values obtained through decomposition, until the total intent target value is achieved or the total intent target value is not achieved.

The intent system needs to collect network states of a large quantity of intent operation objects, the intent system needs to process a large amount of data, and a bottleneck easily occurs. Consequently, efficiency and a success rate of intent achievement is low. In addition, different intent operation objects may correspond to different vendors, and implementations and parameters required by the different vendors for obtaining network states of the intent operation objects are different. Therefore, the intent system needs to adapt to the different vendors to collect the network states of the intent operation objects. When the implementations and parameters of the vendors are modified, or vendors of the intent operation objects change, the intent system cannot respond in time and cannot obtain the network states of the intent operation objects in time. Consequently, the efficiency and the success rate of the intent achievement are low.

SUMMARY

This application provides an intent decomposition method and an apparatus, to improve a success rate and efficiency of intent achievement.

According to a first aspect, this application provides an intent decomposition method. The method includes: A first network device sends a first sub-intent target value; the first network device receives a first message from a second network device, where the first message is used to indicate that a first sub-intent target value corresponding to the second network device is not achieved, and the first message includes a first measurement value of the second network device; and the first network device re-decomposes an intent based on the first measurement value, and sends first sub-intent target values obtained through re-decomposition, until all the first sub-intent target values are achieved or no first sub-intent target value is achieved.

According to the technical solution provided in this application, the second network device obtains a sub-intent achievement status, and when a sub-intention is not achieved, the second network device reports a first measurement value of a sub-intent that can be achieved currently. The first network device re-decomposes the intent based on a first measurement value reported by each low-level intent system related to the first network device. In this application, negotiation between a high-level intent system and the low-level intent system is added, and bottom-level implementation details are shielded. Therefore, the high-level intent system does not need to pay attention to an implementation and a parameter of a vendor to which a bottom-level intent operation object belongs, so that a success rate and efficiency of intent decomposition and execution are ensured.

In a possible implementation, before that a first network device sends a first sub-intent target value, the method further includes: The first network device receives a total intent target value configured by a third network device; and the first network device decomposes the total intent target value to obtain one or more first sub-intent target values.

In this implementation, the first network device may directly receive the total intent target value, and decompose and deliver the total intent target value, to ensure successful intent decomposition and execution.

In a possible implementation, before that a first network device sends a first sub-intent target value, the method further includes: The first network device receives a second sub-intent target value sent by a third network device, where the second sub-intent target value is obtained by decomposing a total intent target value; and the first network device decomposes the second sub-intent target value to obtain one or more first sub-intent target values.

In this implementation, the first network device may receive the second sub-intent target value obtained by decomposing the total intent target value, and decompose and deliver the second sub-intent target value, to ensure successful intent decomposition and execution.

In a possible implementation, the method further includes: The first network device may further receive a second message from a fourth network device, where the second message is used to indicate that a first sub-intent target value corresponding to the fourth network device is achieved.

In this implementation, when a sub-intent is achieved, the fourth network device reports information indicating that the current sub-intent can be achieved. The first network device may re-decompose the intent by comprehensively considering target values reported by a device that does not achieve a sub-intent and a device that achieves a sub-intent, so that intent decomposition and execution efficiency are improved.

In a possible implementation, the total intent target value is related to the first sub-intent target value and/or is related to a quantity of fifth network devices, and the fifth network device is a network device configured to perform an intent operation.

In this implementation, the first sub-intent target value and/or the quantity of the fifth network devices are/is considered in an intent decomposition process, to adapt to requirements of different intent decomposition scenarios.

In a possible implementation, the total intent target value and the first sub-intent target value are absolute values or relative values, the absolute value is not related to state information of the fifth network device, and the relative value is related to the state information of the fifth network device.

In this implementation, the intent target value may be the absolute value or the relative value, to adapt to requirements of different intent decomposition scenarios.

In a possible implementation, the second message includes a second measurement value of the fourth network device, the second measurement value is obtained through prediction based on the state information of the fifth network device corresponding to the fourth network device, and that the first network device re-decomposes an intent based on the first measurement value includes: The first network device re-decomposes the intent based on the first measurement value and the second measurement value.

In this implementation, the second measurement value of the fourth network device is obtained through prediction based on state information of an intent operation object. When re-decomposing the intent, the first network device may refer to the second measurement value, so that a quantity of times of intent decomposition is reduced, and intent decomposition efficiency is improved.

In a possible implementation, the total intent target value is related to the quantity of the fifth network devices, the first message and/or the second message further includes the quantity of the fifth network devices, and that the first network device re-decomposes an intent based on the first measurement value includes: The first network device re-decomposes the intent based on the first measurement value and the quantity of the fifth network devices.

In this implementation, when the first network device re-decomposes the intent, the quantity of the fifth network devices is considered, to adapt to requirements of different intent decomposition scenarios, and improve efficiency and a success rate of intent decomposition.

In a possible implementation, the total intent target value and the first sub-intent target value are relative values, the first message and/or the second message further include/includes a third measurement value that is of the fifth network device before the fifth network device executes a first instruction, and that the first network device re-decomposes an intent based on the first measurement value includes: The first network device re-decomposes the intent based on the first measurement value and the third measurement value.

In this implementation, the first network device re-decomposes the intent based on the third measurement value that is of the fifth network device before the fifth network device executes the first instruction and the first measurement value, to adapt to requirements of different intent decomposition scenarios, and improve efficiency and a success rate of intent decomposition.

In a possible implementation, the method further includes: If all the first sub-intent target values are achieved, the first network device sends a third message to the third network device, where the third message is used to indicate that the total intent target value is achieved; or if no first sub-intent target value is achieved, the first network device sends a fourth message to the third network device, where the fourth message is used to indicate that the total intent target value is not achieved, the fourth message includes a fourth measurement value of the first network device, and the fourth measurement value is determined based on the first measurement value of the second network device.

In this implementation, the first network device may further report, to the third network device, information indicating that the total intent target value is achieved or not achieved. As a high-level intent system of the first network device, the third network device may determine, based on the information indicating that is reported by the first network device and that indicates whether the total intent target value is achieved, whether to allocate a new total intent target value.

In a possible implementation, the third message includes a fifth measurement value of the first network device, and the fifth measurement value is obtained through prediction based on the state information of the fifth network device.

In a possible implementation, the total intent target value is related to the quantity of the fifth network devices, and the third message and/or the fourth message include/includes the quantity of the fifth network devices.

In a possible implementation, the total intent target value and the first sub-intent target value are relative values, and the third message and/or the fourth message include/includes the third measurement value that is of the fifth network device before the fifth network device executes the first instruction.

According to a second aspect, this application provides an intent decomposition method and an apparatus. The method includes: A second network device receives a first sub-intent target value; the second network device sends a first instruction to a fifth network device based on the first sub-intent target value, where the fifth network device is a network device configured to perform an intent operation; the second network device obtains state information of the fifth network device, where the state information is used to indicate a sixth measurement value that is of the fifth network device and that is related to an intent in a current state; and if the first sub-intent target value is not achieved, the second network device sends a first message to a first network device, where the first message is used to indicate that the first sub-intent target value is not achieved, the first message includes a first measurement value of the second network device, and the first measurement value is determined based on the sixth measurement value of the fifth network device.

According to the technical solution provided in this application, the second network device obtains a sub-intent achievement status, and collects the state information of the fifth network device. When the sub-intention is not achieved, the second network device reports a first measurement value of a sub-intent that can be achieved currently, so that the first network device re-decomposes the intent based on a first measurement value reported by each low-level intent system related to the first network device. In this application, negotiation between a high-level intent system and the low-level intent system is added, and bottom-level implementation details are shielded. Therefore, the high-level intent system does not need to pay attention to an implementation and a parameter of a vendor to which a bottom-level intent operation object belongs, so that a success rate and efficiency of intent decomposition and execution are ensured.

In a possible implementation, the method further includes: If the first sub-intent target value is achieved, the second network device sends a second message to the first network device, where the second message is used to indicate that the first sub-intent target value is achieved.

In this implementation, when a sub-intent is achieved, the fifth network device reports information indicating that the current sub-intent can be achieved. Therefore, the first network device can re-decompose the intent by comprehensively considering a sub-intent that is not achieved and an achieved sub-intent, so that intent decomposition and execution efficiency are improved.

In a possible implementation, the total intent target value is related to the first sub-intent target value and/or is related to a quantity of fifth network devices.

In this implementation, the first sub-intent target value and/or the quantity of the fifth network devices are/is considered in the intent decomposition process, to adapt to requirements of different intent decomposition scenarios.

In a possible implementation, the total intent target value and the first sub-intent target value are absolute values or relative values, the absolute value is not related to state information of the fifth network device, and the relative value is related to the state information of the fifth network device.

In this implementation, the intent may be the absolute value or the relative value, to adapt to requirements of different intent decomposition scenarios.

In a possible implementation, the second message includes a second measurement value of the second network device, and the second measurement value is obtained through prediction based on the state information of the fifth network device.

In this implementation, the second measurement value is obtained through prediction based on state information of an intent operation object. The second network device reports the second measurement value, so that when re-decomposing the intent, the first network device can refer to the second measurement value. Therefore, a quantity of times of intent decomposition is reduced, and intent decomposition efficiency is improved.

In a possible implementation, the total intent target value is related to the quantity of the fifth network devices, and the first message and/or the second message further includes the quantity of the fifth network devices.

In this implementation, the second network device may report the quantity of the fifth network devices, so that when the first network device re-decomposes the intent, the quantity of the fifth network devices is considered, to adapt to requirements of different intent decomposition scenarios, and improve efficiency and a success rate of intent decomposition.

In a possible implementation, the total intent target value and the first sub-intent target value are relative values, and the first message and/or the second message further include/includes a third measurement value that is of the fifth network device before the fifth network device executes the first instruction.

In this implementation, the second network device may report the third measurement value before the fifth network device executes the first instruction, so that the first network device re-decomposes the intent based on the third measurement value that is of the fifth network device before the fifth network device executes the first instruction and the first measurement value, to adapt to requirements of different intent decomposition scenarios, and improve efficiency and a success rate of intent decomposition.

According to a third aspect, this application provides a communication apparatus. The apparatus may be a network device, or may be a chip used in a network device. The apparatus has a function of implementing the first aspect or the embodiments of the first aspect. The function may be implemented by hardware, or may be implemented by hardware executing corresponding software. The hardware or the software includes one or more modules corresponding to the function.

According to a fourth aspect, this application provides a communication apparatus. The apparatus may be a network device, or may be a chip used in a network device. The apparatus has a function of implementing the second aspect or the embodiments of the second aspect. The function may be implemented by hardware, or may be implemented by hardware executing corresponding software. The hardware or the software includes one or more modules corresponding to the function.

According to a fifth aspect, this application provides a communication apparatus. The communication apparatus includes a unit or means (means) configured to perform the foregoing aspects or the steps in the foregoing aspects.

According to a sixth aspect, this application provides a communication apparatus. The communication apparatus includes a processor and an interface circuit. The processor is configured to: communicate with another apparatus through the interface circuit, and perform the methods in the foregoing aspects or the embodiments of the foregoing aspects. There are one or more processors.

According to a seventh aspect, this application provides a communication apparatus. The communication apparatus includes a processor, configured to: be connected to a memory, and invoke a program stored in the memory, to perform the methods in the foregoing aspects or the embodiments of the foregoing aspects. The memory may be located inside or outside the apparatus. In addition, there are one or more processors.

According to an eighth aspect, this application further provides a computer-readable storage medium. The computer-readable storage medium stores instructions. When the instructions are run on a computer, a processor is enabled to perform the methods in the foregoing aspects or the embodiments of the foregoing aspects.

According to a ninth aspect, this application further provides a computer program product including instructions. When the computer program product runs on a computer, the computer is enabled to perform the methods in the foregoing aspects or the embodiments of the foregoing aspects.

According to a tenth aspect, this application further provides a chip system, including a processor, configured to perform the methods in the foregoing aspects or the embodiments of the foregoing aspects.

According to an eleventh aspect, this application further provides a communication system, including a first network device configured to perform any method in the first aspect and a second network device configured to perform any method in the second aspect.

DESCRIPTION OF EMBODIMENTS

Figure 1:
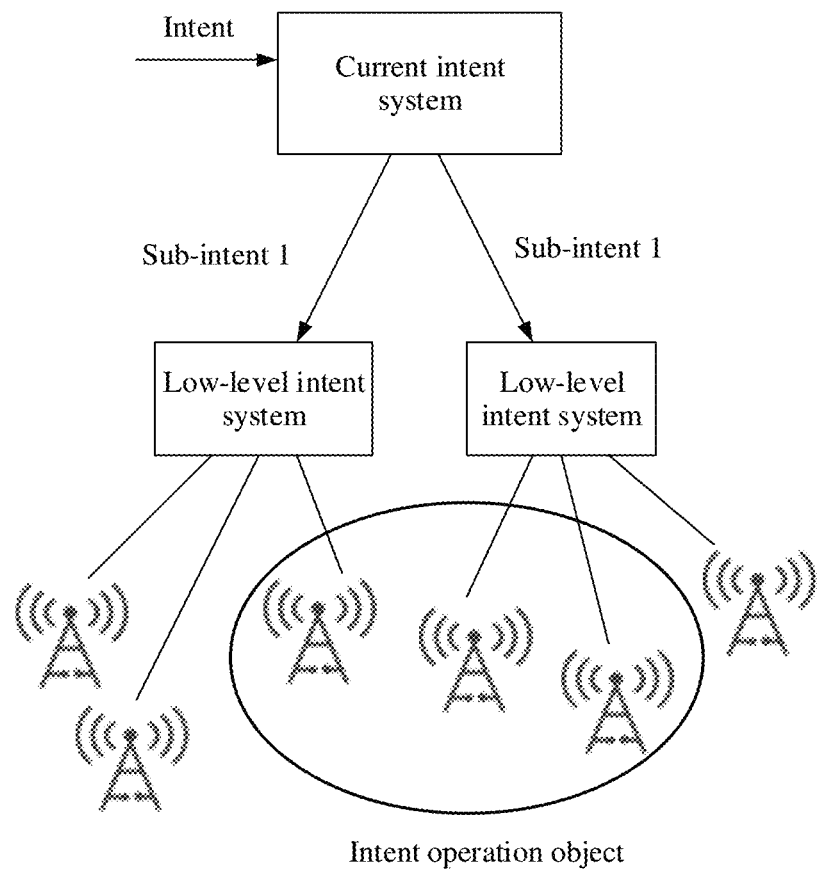
FIG. 1 is a schematic diagram of a network architecture of intent decomposition according to this application.

The following further describes the present invention in detail with reference to accompanying drawings.

Technical solutions in embodiments of this application may be applied to various communication systems, for example, a 4th generation (4th Generation, 4G) system such as a long term evolution (long term evolution, LTE) system, a worldwide interoperability for microwave access (worldwide interoperability for microwave access, WiMAX) communication system, a future 5th generation (5th Generation, 5G) system such as a new radio access technology (new radio access technology, NR), a future communication system such as a 6G system and the like.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the term "for example" in embodiments of this application is used to represent giving an example, an illustration, or a description. Any embodiment or design described as an "example" in this application should not be explained as being more preferred or having more advantages than another embodiment or design. Exactly, the term "example" is used to present a concept in a specific manner.

A network architecture and a service scenario described in embodiments of this application are intended to describe technical solutions in embodiments of this application more clearly, and do not constitute a limitation on the technical solutions provided in embodiments of this application. A person of ordinary skill in the art may know that with evolution of the network architecture and emergence of a new service scenario, the technical solutions provided in embodiments of this application are also applicable to similar technical problems.

The following describes some terms in embodiments of this application, to facilitate understanding of a person skilled in the art.

(1) Service and system structure (Service&SystemsAspects, SA): The service and system structure is responsible for technical cooperation of work undertaken by the 3rd generation partnership project (3rd Generation Partnership Project, 3GPP) and is responsible for an overall structure and integrity of the system. The SA includes an SA5. The SA5 serves as a network management system, and is responsible for constructing a network management system structure and a specific information model. Currently, the 3GPP SA5 uses full network resource modeling and full network object management for defining a conventional northbound interface. The 3GPP SA5 initiates research on an intent-driven management service (Intent-Driven Management Service, IDMS) (refer to 3GPP TR 28.812).

(2) Network device: The network device includes a radio access network (Radio Access Network, RAN) device and/or a core network (Core Network, CN) device. The radio access network device is also referred to as an access network device. The network device may further include a network management system (Network Management System, NMS), an element management system (Element Management System, EMS), a network element (Network Element, NE), and the like.

In an intent decomposition scenario, the network device may further include a high-level (high-level) intent system, a current intent system (also referred to as an intent system), a low-level (low-level) intent system, and an intent operation object. The high-level intent system is configured to send a total intent target value. A function of the high-level intent system may also be undertaken by management personnel such as a network administrator. For example, the high-level intent system is an operation support system (Operation Support Systems, OSS). The current intent system is configured to: receive an intent, where the intent includes: the total intent target value sent by the high-level intent system, and/or receive a sub-intent target value that is obtained by decomposing the total intent target value and that is sent by an intent system at a higher level, decompose the total intent target value or the sub-intent target value, and send a sub-intent target value obtained through decomposition to the low-level intent system. For example, the current intent system may be an NMS, and the low-level intent system is configured to: receive the sub-intent target value obtained by the current intent system through decomposition; and deliver a control instruction to a corresponding intent operation object to implement the intent. In embodiments of this application, the low-level intent system may collect required network state information of an intent operation object, the network state information is related to an intent that needs to be implemented, the intent operation object is configured to execute the control instruction to implement the intent, and the intent operation object is a mobile network element, such as a base station or a core network element.

Figure 2:
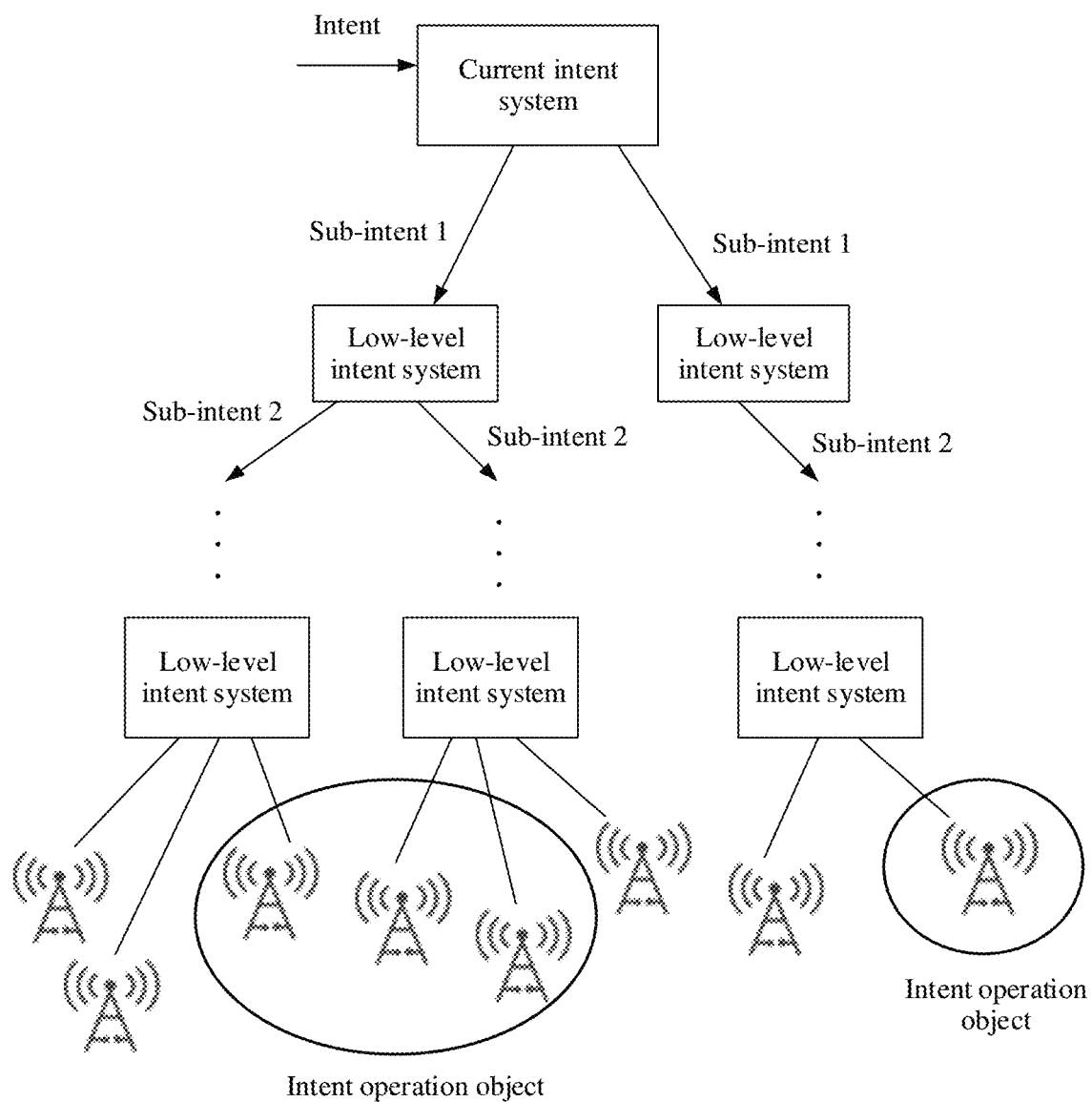
FIG. 2 is another schematic diagram of a network architecture of intent decomposition according to this application.

A network architecture shown in the intent decomposition scenario may be shown in FIG. 1 or FIG. 2. As shown in FIG. 1, the network architecture includes a current intent system, one level of low-level intent systems, and an intent operation object. As shown in FIG. 2, the network architecture includes a current intent system, a plurality of levels of low-level intent systems, and an intent operation object.

Specifically, a current intent system at a top level may be an NMS, and is configured to: decompose a received total intent target value into sub-intent target values (for example, sub-intents 1 shown in FIG. 1 or FIG. 2), and deliver the sub-intent target values to low-level intent systems. The low-level intent system may be an EMS. As shown in FIG. 1, as a network device directly connected to the intent operation object, the low-level intent system delivers a corresponding instruction to the intent operation object based on a received sub-intent target value. Alternatively, as shown in FIG. 2, as a network device not directly connected to the intent operation object, the low-level intent system continues to decompose a received sub-intent target value, and sends sub-intent target values (sub-intents 2 shown in FIG. 2) obtained through decomposition to low-level intent systems at a lower level. The procedure is repeated until the sub-intent target values are sent to network devices that are at a bottom level and that are directly connected to the intent operation object. The network device that is at the bottom level and that is directly connected to the intent operation object sends an instruction to the intent operation object based on a received sub-intent target value. The intent operation object may be an NE, and is configured to execute the received instruction to implement the intent.

It may be understood that concepts of the current intent system and the low-level intent system are relative. For example, a network device A receives a sub-intent target value sent by a network device B, and continues to decompose the sub-intent target value. In this case, the network device A is a low-level intent system relative to the network device B, and the network device B is a current intent system. The network device A sends a sub-intent obtained through decomposition to the network device C. In this case, the network device B is a current intent system relative to the network device C, and the network device C may be understood as a low-level intent system.

(3) Northbound interface and southbound interface: The northbound interface is for sending to an EMS, and the southbound interface is for sending from the EMS to a network element.

The term "and/or" in this application describes an association relationship for describing associated objects and represents that three relationships may exist. For example, A and/or B may represent the following three cases: Only A exists, both A and B exist, and only B exists. The character "/" usually indicates an "or" relationship between the associated objects.

"A plurality of" in this application means two or more.

In addition, it should be understood that, in descriptions of this application, terms such as "first" and "second" are merely used for distinguishing and description, but should not be understood as an indication or implication of relative importance, or an indication or implication of a sequence.

For ease of understanding of embodiments of this application, an application scenario used in this application is first described.

Currently, the 3GPP SA5 uses full network resource modeling and full network object management for defining a conventional northbound interface (for example, an itf-N interface). The NMS directly adds, deletes, modifies, and queries all southbound managed objects (namely, network elements) through operations such as configuration management (Configuration Management, CM), performance management (Performance Management, PM), and fault management (Fault Management, FM). This not only raises a management and O&M threshold for operators, but also exposes differentiated implementation of device vendors. Consequently, it is difficult to implement interoperability between different vendors.

Figure 3:
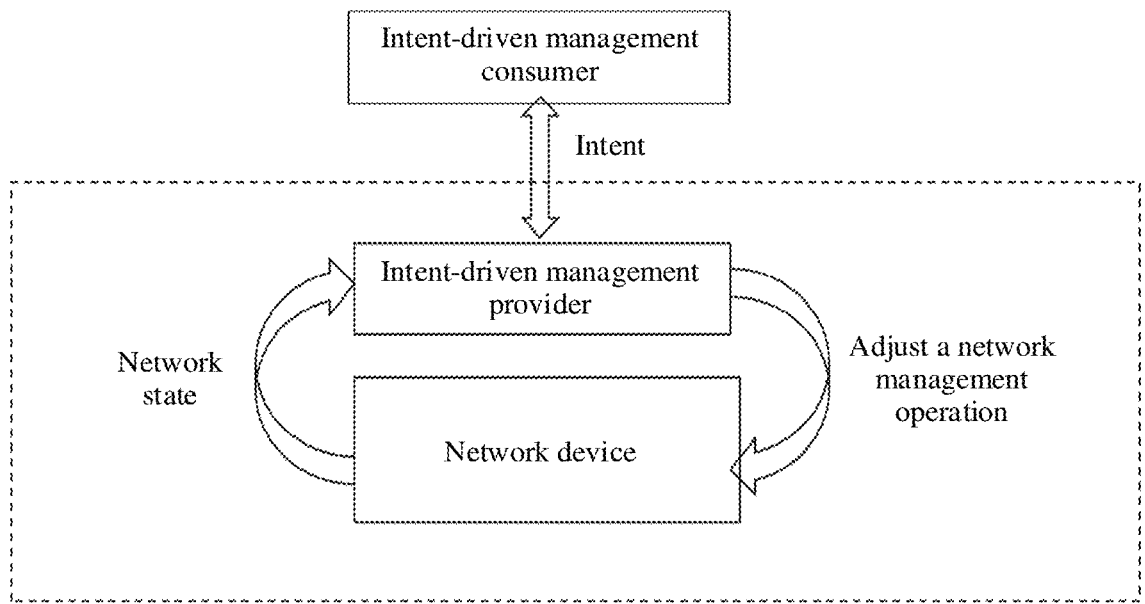
FIG. 3 is a schematic diagram of an intent decomposition procedure according to this application.

To reduce management complexity of basic network settings and improve O&M efficiency in a multi-vendor scenario, the 3GPP SA5 initiates research on the IDMS, including an intent model for expressing an intent and descriptions of intent delivery and execution. As shown in FIG. 3, an intent-driven management consumer (for example, an IDM MnS Consumer) sends an intent to an intent-driven management provider (for example, an IDM MnS Producer). After receiving the intent, the intent-driven management provider interacts with a subordinate network device. The intent-driven management provider continuously monitors a network state of the subordinate network device, and continuously adjusts a network management operation (for example, intent decomposition or a control instruction) based on the network state, to meet a requirement expressed by the intent. The subordinate network device may be configured to provide a communication service (Communication Service), a network (Network), or the like. That is, after receiving the intent, the intent system translates the intent into a requirement on a network and specific operations based on the network state, and interacts with an NE to perform the operations to achieve the intent. A structure of the intent-driven management provider may be shown in the current intent system and the low-level intent system shown in FIG. 1 or FIG. 2. The intent-driven management consumer may be a high-level intent system or management personnel.

Specifically, after the current intent system receives the intent from the administrator or the high-level intent system, because intent operation objects (for example, network elements) corresponding to the intent are managed by different low-level intent systems, the current intent system decomposes the intent, and sends sub-intents obtained through decomposition to the low-level intent systems. This type of special intent, namely, an intent for which a measurement value is used as a target value, is referred to as a comprehensive intent in embodiments of this application, where during intent decomposition, it only needs to be ensured that a measurement value of each sub-intent (that is, each sub-intent target value) obtained through decomposition comprehensively satisfies a measurement value of a total intent (namely, a total intent target value). Each sub-intent target value may have any value. Generally, the measurement value of each sub-intent is related to the network state of the intent operation object.

For this type of comprehensive intent, the following cases may occur in an intent decomposition process: Case 1: Due to different network resources, network capabilities of some low-level intent systems are insufficient, so that the total intent target value cannot be satisfied, and network capabilities of some other low-level intent systems are higher than a requirement of the sub-intent target value. Case 2: A change of the network state affects a capability of the low-level intent system to achieve an intent, a sub-intent target value obtained through decomposition based on a current network state may not adapt to a subsequent network state, and once a sub-intent target value is not satisfied, the total intent target value cannot be satisfied. Therefore, for this type of comprehensive intent, after the intent is decomposed, intents obtained through decomposition need to be adjusted based on the network state to improve a success rate of achieving the total intent target value.

Figure 4:
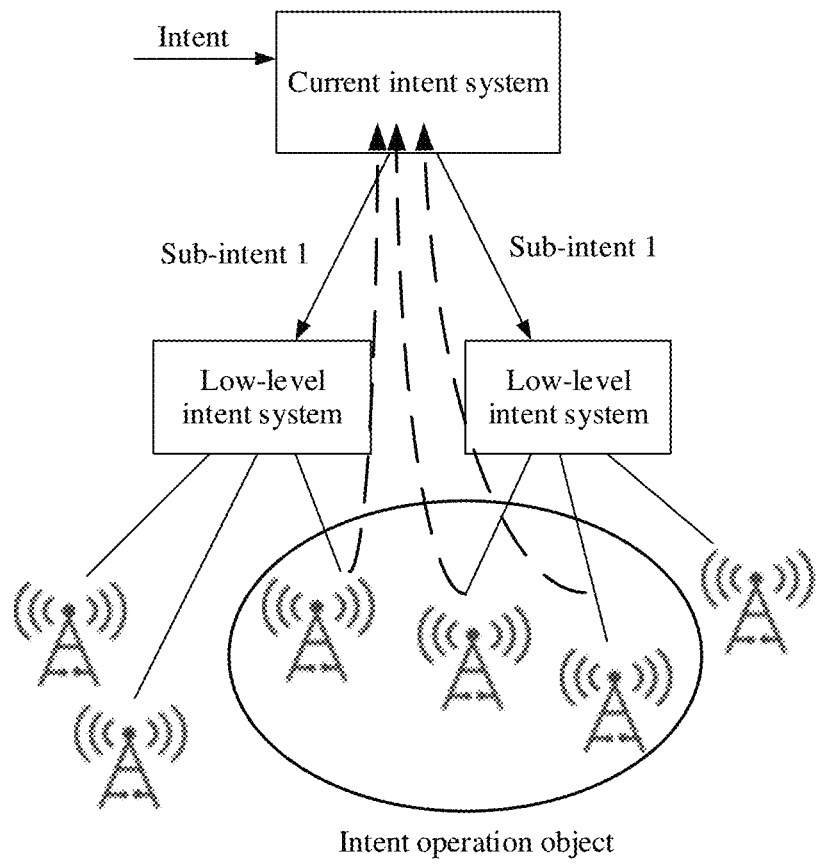
FIG. 4 is a schematic diagram of an intent decomposition procedure according to this application.

As shown in FIG. 4, after a total intent target value is decomposed by a current intent system and delivered to low-level intent systems, the current intent system may obtain a network state of an intent operation object through a PM operation, and determine achievement statuses of sub-intent target values. Based on the achievement statuses of the sub-intent target values, the current intent system adjusts intent decomposition and re-delivers new sub-intent target values obtained through decomposition.

However, there are still the following problems in a current technology: A high-level intent system (the current intent system at a top level shown in FIG. 1 or FIG. 2) requires network states of a large quantity of bottom-level network elements, the intent system needs to process a large amount of data, and a bottleneck easily occurs. In addition, different intent operation objects may correspond to different vendors, and implementations and parameters of the different vendors for obtaining network states of the intent operation objects are different, and the high-level intent system needs to be configured with the implementations and parameters of the different vendors to obtain the network states of the intent operation objects. Therefore, it is difficult for the high-level intent system to adapt to changes of the implementations and parameters of the vendors and changes of the vendors. Consequently, a success rate and efficiency of intent achievement are low.

In view of this, to improve the success rate and the efficiency of intent achievement, this application provides an intent decomposition method and an apparatus to ensure the success rate and the efficiency of intent achievement in the intent decomposition process.

In this method, for a second network device that does not achieve a sub-intent target value, a first network device re-decomposes an intent based on a first measurement value of the second network device, and delivers a new first sub-intent target value obtained through re-decomposition. In this way, for the second network device that does not achieve the first sub-intent target value, the first sub-intent target value is re-decomposed with reference to the first measurement value of the second network device, so that a quantity of times of re-decomposing the first sub-intent target value can be reduced, and efficiency can be improved. In addition, the first network device obtains the first measurement value of the second network device, but does not directly obtain a measurement value of an intent operation object. Therefore, data volume of interaction is reduced, and there is no need to pay attention to whether it is a multi-vendor scenario, so that the success rate and the efficiency of intent achievement can be improved.

Figure 5:
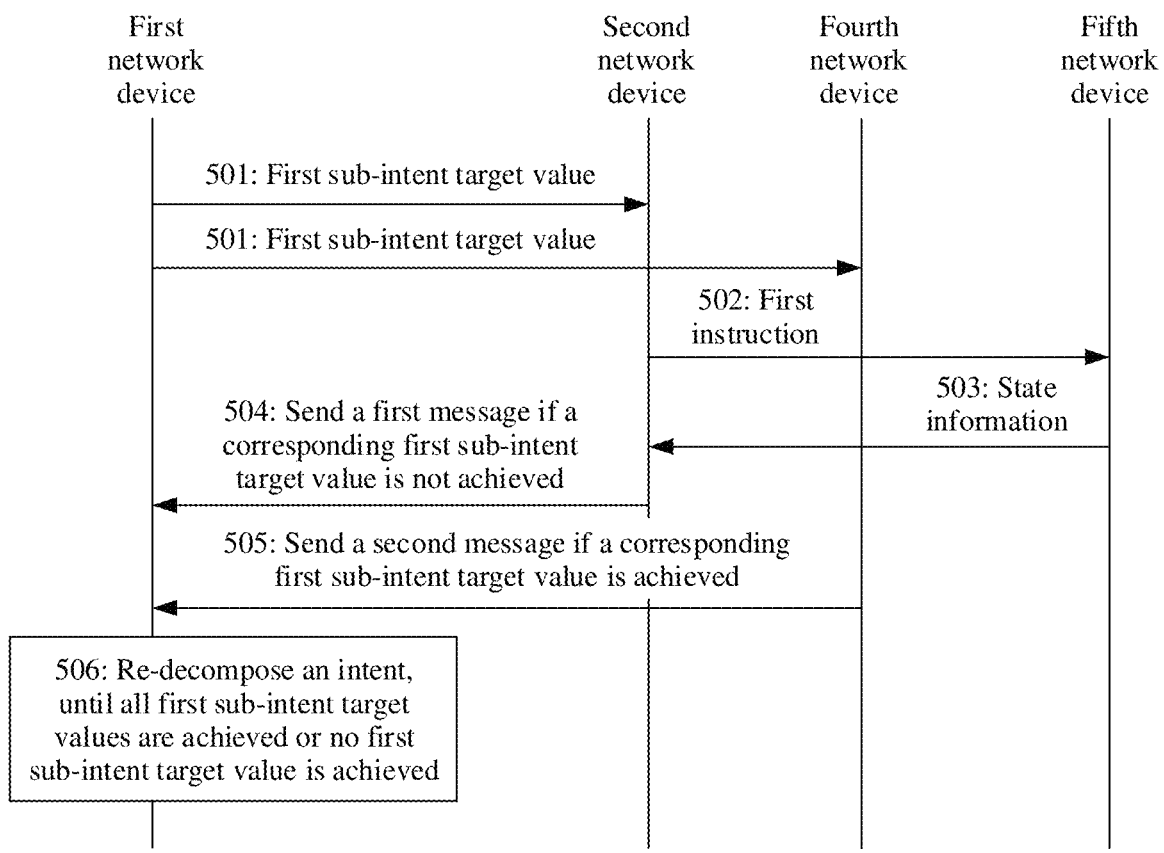
FIG. 5 is a schematic diagram of an intent decomposition procedure according to this application.

An embodiment of this application provides an intent decomposition method. The method may be applied to the system shown in FIG. 1 to FIG. 2. The following describes in detail a specific process of the intent decomposition method with reference to FIG. 5. As shown in FIG. 5, the process includes the following steps.

Step 501: A first network device sends a first sub-intent target value, a second network device receives the first sub-intent target value, and a third network device receives the first sub-intent target.

For each network device subordinate to the first network device, the first network device obtains, through decomposition, a first sub-intent target value corresponding to each network device subordinate to the first network device. In this embodiment of this application, a network device that is located at a lower level of the first network device and that cannot achieve the corresponding first sub-intent target value is referred to as the second network device, and a network device that is located at a lower level of the first network device and that can achieve the corresponding first sub-intent target value is referred to as the fourth network device. It may be understood that the second network device and the fourth network device are merely used to distinguish whether the network device achieves the corresponding first sub-intent target value, but does not constitute a limitation on the network device subordinate to the first network device.

The first network device sends the first sub-intent target value corresponding to each subordinate network device, the second network device receives a first sub-intent target value corresponding to the second network device, and the fourth network device receives a first sub-intent target value corresponding to the fourth network device. There are one or more second network devices and one or more fourth network devices. For example, the first network device sends a first sub-intent target value 1 to a second network device 1, sends a first sub-intent target value 2 to a second network device 2, and the first network device sends a first sub-intent target value 3 to the fourth network device.

An intent is used for network management, and the first sub-intent target value is used to indicate the network devices subordinate to the first network device to implement the corresponding first sub-intent target values. In other words, the second network device and the third network device are expected to achieve the corresponding first sub-intent targets, to achieve a total intent and implement network management.

If the first network device is an intent system at a top level of a network (for example, the current intent system shown in FIG. 1 or FIG. 2), before step 501, the first network device may further receive a total intent target value configured by management personnel or a third network device, and the first network device may decompose the total intent target value to obtain one or more first sub-intent target values. Generally, the first network device decomposes the total intent target value to obtain a plurality of first sub-intent target values.

For example, the third network device is a high-level intent system.

Optionally, the first network device receives the total intent. The total intent is used to indicate related information about the total intent target value, and the total intent includes an intent identifier, information about intent operation objects, and the total intent target value. The intent identifier is used to identify an intent type, such as a service end-to-end packet loss rate, a service end-to-end delay, or an average throughput rate of a network element. The information about the intent operation object is a network element that executes an intent corresponding to the intent identifier. The first network device may determine, based on the information about the intent operation objects, that the intent operation objects are managed by a plurality of low-level intent systems, and the first network device decomposes the total intent target value.

If the first network device is an intent system not at the top level of a network, for example, a middle-level intent system (for example, the low-level intent system not directly connected to the intent operation object shown in FIG. 1 or FIG. 2), before step 501, the first network device may further receive the second sub-intent target value sent by the third network device, and the first network device may decompose the second sub-intent target value to obtain one or more first sub-intent target values. The second sub-intent target value is obtained by decomposing the total intent target value. Specifically, the second sub-intent target value may be obtained by another intent system by decomposing the total intent target value once or for a plurality of times.

For example, the third network device is not a high-level intent system, for example, is a middle-level intent system, and the first network device is a low-level intent system relative to the third network device.

Optionally, the first network device receives a second sub-intent. The second sub-intent is used to indicate related information about the second sub-intent target value, and the second sub-intent includes an intent identifier, information about intent operation objects, and the second sub-intent target value. The first network device may determine, based on the information about the intent operation objects, that the intent operation objects are managed by a plurality of low-level intent systems, and the first network device decomposes the second sub-intent target value.

The total intent target value is related to the first sub-intent target value and/or is related to a quantity of fifth network devices, and the fifth network device is a network device configured to perform an intent operation, namely, an intent operation object. In other words, the first target sub-intent value obtained through decomposition satisfies the total target intent value, and/or the first network device needs to refer to the quantity of the fifth network devices when decomposing the total target intent value to obtain the first target sub-intent value.

In addition, optionally, each of the total intent target value, the second sub-intent target value, and the first sub-intent target value is an absolute value or a relative value. The absolute value is not related to state information of the fifth network device, that is, the absolute value is a preset specific value. For example, it is ensured that an average throughput rate of the intent operation object is greater than 10 megabits per second (Million bits per second, Mbps). The relative value is related to the state information of the fifth network device. To be specific, the relative value uses a measurement value corresponding to the state information of the fifth network device as a base value. For example, current energy consumption of the fifth network device is used as base energy consumption, and the energy consumption is reduced by 20% based on the base energy consumption; and a current packet loss rate corresponding to the fifth network device is used as a base packet loss rate, to ensure that an end-to-end packet loss rate is less than the base packet loss rate which is 1%. The state information of the fifth network may be a current network state of the fifth network device.

In conclusion, comprehensive intents may be further classified from the following two dimensions: 1. The comprehensive intents are classified into Class A and Class B based on a manner of combining sub-intents into a total intent. For Class A, the general intent target value is related to only the sub-intent target value. For example, to ensure that an end-to-end delay is less than 5 ms, it needs to be ensured that a sum of delays of all second network devices after decomposition is 5 ms. For Class B, the total intent target value is related to the sub-intent target value, and is further related to a quantity of operation objects (namely, the quantity of the fifth network devices) involved in the sub-intent. For example, to ensure that an average throughput rate of the intent operation objects is greater than 10 Mbps, it needs to be ensured that an average value of throughput rates of all second network devices after decomposition is greater than 10 Mbps, and a quantity of intent operation objects whose throughput rates are less than a specified value is less than a first quantity. 2. An absolute target and a relative target are defined based on intent target values. For the absolute target, the intent target value is an absolute value. For example, a bandwidth of 10 Mbps is to be ensured. For the relative target, the intent target value is a relative value. The intent target value is related to a base value of the fifth network device measured in a current state. For example, energy consumption is reduced by 20% relative to the base value.

Step 502: The second network device sends, based on the first sub-intent target value corresponding to the second network device, a first instruction to a fifth network device corresponding to the second network device, where the fifth network device is a network device configured to perform an intent operation.

In addition, the fourth network device sends, based on the first sub-intent target value corresponding to the third network device, a first instruction to a fifth network device corresponding to the fourth network device (not shown in FIG. 5).

The first instruction is an instruction used to control the fifth network device to perform the intent operation.

The fifth network device corresponding to the second network device is a fifth network device subordinate to the second network device, that is, a fifth network device that is directly connected to the second network device and that is located at a lower level of the second network device. The fifth network device corresponding to the fourth network device is a fifth network device subordinate to the fourth network device.

Step 503: The second network device obtains state information of the fifth network device corresponding to the second network device, where the state information is used to indicate a sixth measurement value that is of the fifth network device corresponding to the second network device and that is related to an intent in a current state.

In addition, the fourth network device obtains state information of the fifth network device corresponding to the fourth network device, where the state information is used to indicate a sixth measurement value that is of the fifth network device corresponding to the fourth network device and that is related to an intent in a current state (not shown in FIG. 5).

Figure 6:
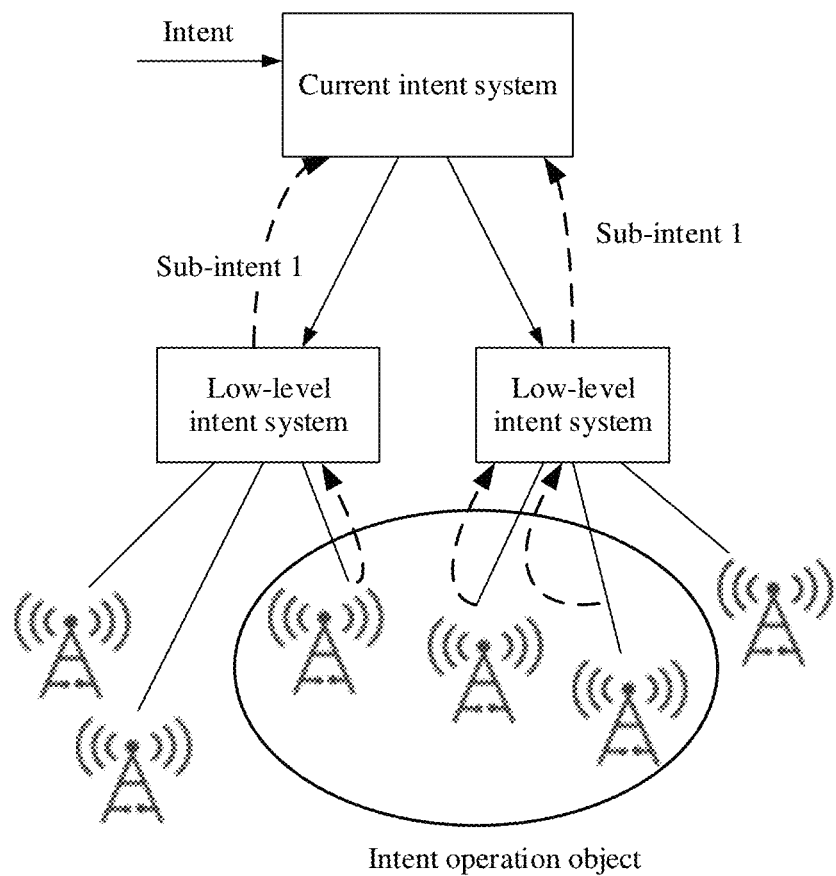
FIG. 6 is a schematic diagram of an intent decomposition procedure according to this application.

Specifically, for example, as shown in FIG. 6, the second network device (for example, a low-level intent system shown in FIG. 6) may obtain the state information of the fifth network device (for example, an intent operation object shown in FIG. 6) by using a PM operation.

Because the second network device may directly obtain the state information of the fifth network device, the second network device can determine, based on the state information of the fifth network device, the sixth measurement value that is of the fifth network device and that is related to the intent in the current state, so that the second network device can determine and report a first measurement value of the second network device based on the sixth measurement value of the fifth network device. Therefore, an intent system at a top level does not need to directly obtain the current state from an intent operation object at a bottom level, and the intent system at the top level does not need to pay attention to a vendor of the intent operation object or configure an implementation and a parameter corresponding to the vendor of the intent operation object. The second network device is used as a middle-level intent system, and the second network device needs to maintain fewer fifth network devices and process less data, so that a possibility of a bottleneck is effectively reduced. In addition, if the second network device is used as an intent system that is at the bottom level and that is connected to the fifth network device, the second network device needs to configure fewer implementations and parameters corresponding to different vendors. In this way, changes of an implementation and a parameter of a vendor can be more flexibly adapted to, and a success rate and efficiency of intent achievement can be ensured.

In step 503, an execution process of the fourth network device is similar to an execution process of the second network device, and details are not described herein again.

Step 504: If the first sub-intent target value corresponding to the second network device is not achieved, the second network device sends a first message to the first network device, where the first message is used to indicate that the first sub-intent target value corresponding to the second network device is not achieved, the first message includes a first measurement value of the second network device, and the first measurement value is determined based on the sixth measurement value of the fifth network device corresponding to the second network device. The first network device receives the first message.

The first measurement value of the second network device may be used to represent a target value that can be currently achieved by the second network device. The first measurement value of the second network device may be a sum value, an average value, or the like of sixth measurement values of all fifth network devices subordinate to the second network device. Specifically, the first measurement value may be calculated based on an actual scenario and requirement. This is not listed one by one herein.

If the total intent target value is related to the quantity of the fifth network devices, the first message may further include the quantity of the fifth network devices corresponding to the second network device.

If the total intent target value and the first sub-intent target value are relative values, the first message may further include a third measurement value that is of the fifth network device corresponding to the second network device before the fifth network device executes the first instruction. The third measurement value may be understood as a base value that is of the fifth network device corresponding to the second network device before the fifth network device executes the first instruction.

The first message indicating that the first sub-intent target value is not achieved is sent to the first network device, so that it can be ensured that when the first network device re-decomposes the intent, a new first sub-intent target value obtained through re-decomposition for the second network device is not stricter than the reported first measurement value.

If the first sub-intent target value corresponding to the second network device is achieved, the second network device may further send a second message to the first network device, where the second message is used to indicate that the first sub-intent target value corresponding to the second network device is achieved. If the first sub-intent target value corresponding to the second network device is achieved, the second network device may be understood as the fourth network device.

Step 505: If the first sub-intent target value corresponding to the fourth network device is achieved, the fourth network device sends a second message to the first network device, where the second message is used to indicate that the first sub-intent target value corresponding to the fourth network device is achieved. The first network device receives the second message.

Optionally, the network device may further have a prediction capability, and the second message may further include a second measurement value of the fourth network device. The second measurement value is obtained through prediction based on state information of the fifth network device corresponding to the fourth network device. In this way, when subsequently re-decomposing the intent, the first network device can refer to the second measurement value, so that a quantity of times of intent decomposition is reduced, and intent decomposition efficiency is improved. In addition, when the first network device subsequently re-decomposes the intent, the first sub-intent target value obtained through re-decomposition for the fourth network device matches the second measurement value.

If the total intent target value is related to the quantity of the fifth network devices, the second message may further include the quantity of the fifth network devices corresponding to the fourth network device.

If the total intent target value and the first sub-intent target value are relative values, the second message may further include a third measurement value that is of the fifth network device corresponding to the fourth network device before the fifth network device executes the first instruction.

The second message indicating that the first sub-intent target value is achieved is sent to the first network device, so that it can be ensured that when the first network device re-decomposes the intent, a new first sub-intent target value obtained through re-decomposition for the fourth network device is stricter than the achieved first sub-intent target value, to ensure that the final first sub-intent target value obtained through decomposition satisfies a required total intent target value.

If the first sub-intent target value corresponding to the fourth network device is not achieved, the fourth network device may further send a first message to the first network device, where the first message is used to indicate that the first sub-intent target value corresponding to the fourth network device is not achieved, the first message includes a first measurement value of the fourth network device, and the first measurement value is determined based on the sixth measurement value of the fifth network device corresponding to the fourth network device. If the first sub-intent target value corresponding to the fourth network device is not achieved, the fourth network device may be understood as the second network device.

Step 506: The first network device re-decomposes the intent based on the first measurement value, and sends first sub-intent target values obtained through decomposition, until all the first sub-intent target values are achieved or no first sub-intent target value is achieved.

For the second network device that sends the first message, the first target sub-intent value obtained through re-decomposition matches the first measurement value.

For example, if the first network device receives first messages sent by all subordinate network devices, the first network device determines that no first sub-intent target value is achieved; or if the first network device receives second messages sent by all subordinate network devices, the first network device determines that all first sub-intent target values are achieved.

If the total intent target value is related to the quantity of the fifth network devices, the first message and/or the second message further include/includes the quantity of the fifth network devices, and the first network device may further re-decompose the intent based on the first measurement value and the quantity of the fifth network devices. Specifically, the first message further includes the quantity of the fifth network devices corresponding to the second network device, and/or the second message further includes the quantity of the fifth network devices corresponding to the fourth network device. The first network device may further re-decompose the intent based on the first measurement value, the quantity of the fifth network devices corresponding to the second network device, and/or the quantity of the fifth network devices corresponding to the fourth network device.

If the total intent target value and the first sub-intent target value are relative values, the first message and/or the second message further include/includes a third measurement value that is of the fifth network device before the fifth network device executes a first instruction, and the first network device may further re-decompose the intent based on the first measurement value and the third measurement value. Specifically, the first message further includes the third measurement value that is of the fifth network device corresponding to the second network device before the fifth network device executes the first instruction, and/or the third measurement value that is of the fifth network device corresponding to the fourth network device before the fifth network device executes the first instruction. The first network device may further re-decompose the intent based on the first measurement value, the third measurement value that is of the fifth network device corresponding to the second network device before the fifth network device executes the first instruction, and/or the third measurement value that is of the fifth network device corresponding to the fourth network device before the fifth network device executes the first instruction.

In addition, regardless of whether all the first sub-intent target values are achieved, the first network device may report information to an intent system at a higher level of the first network device, to notify the higher-level intent system that all the first sub-intent targets are achieved or not achieved. For example, if all the first sub-intent target values are achieved, the first network device may further send a third message to the third network device, where the third message is used to indicate that the total intent target value is achieved. If no first sub-intent target value is achieved, the first network device may further send a fourth message to the third network device, where the fourth message is used to indicate that the total intent target value is not achieved, and the fourth message may further include a fourth measurement value of the first network device. For example, the fourth measurement value is determined based on the first measurement value of the second network device. For another example, the fourth measurement value is determined based on a first measurement value of each network device subordinate to the first network device.

Optionally, the third message includes a fifth measurement value of the first network device, and the fifth measurement value is obtained through prediction based on state information of the fifth network device. In this way, when the intent is subsequently re-decomposed, reference may be made to the fifth measurement value, so that a quantity of times of intent decomposition is reduced, and intent decomposition efficiency is improved.

The total intent target value is related to the quantity of the fifth network devices, and the third message and/or the fourth message include/includes the quantity of the fifth network devices. Optionally, the fifth network device may be all fifth network devices corresponding to the first network device.

In addition, optionally, if the total intent target value and the first sub-intent target value are relative values, the third message and/or the fourth message include/includes the third measurement value that is of the fifth network device before the fifth network device executes the first instruction. Optionally, the fifth network device may be all fifth network devices corresponding to the first network device.

According to the solution provided in this embodiment of this application, for the comprehensive intent, a negotiation mechanism between the high-level intent system and the low-level intent system is added. The low-level intent system collects the network state of the intent operation object, and obtains an intent achievement status. When the intent received by the low-level intent system is not achieved, the low-level intent system determines, based on the network state of the intent operation object, an achievement status of the current intent, and then sends the achievement status of the current intent to the high-level intent system, and the high-level intent system re-decomposes the intent based on the information reported by related low-level intent systems to improve the success rate and the efficiency of intent achievement.

Figure 7:
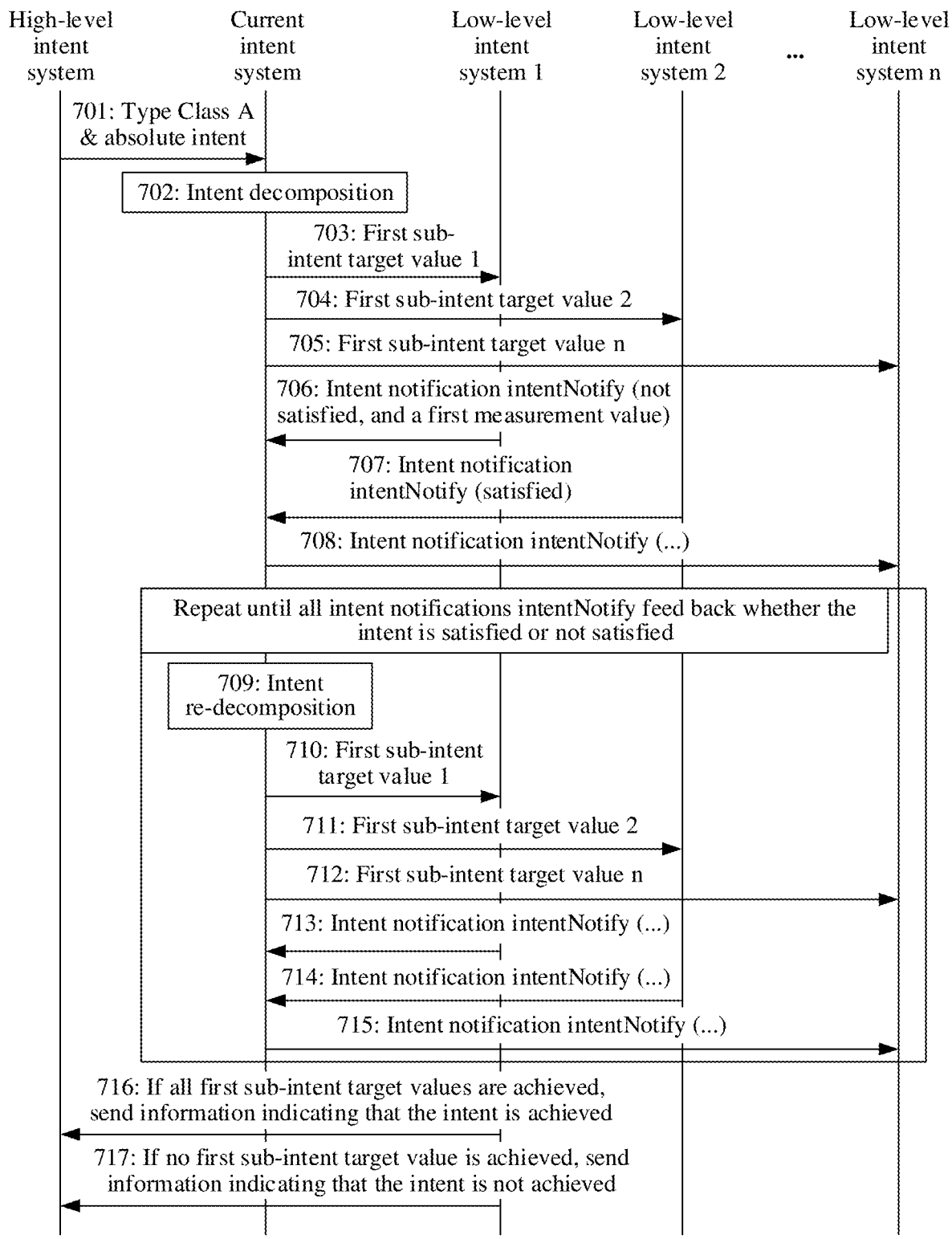
FIG. 7 is a schematic diagram of an intent decomposition procedure according to this application.

Based on FIG. 5 and FIG. 6, this embodiment of this application describes in detail a specific intent decomposition process. Refer to FIG. 7. In this embodiment of this application, the total intent target value is related to the first sub-intent target value, and the total intent target value and the first sub-intent target value are absolute values. This is referred to as a type Class A & absolute intent for short in this embodiment of this application. Specifically, the following steps are included.

Step 701: A high-level intent system (namely, the third network device) sends Class A & absolute intent information to a current intent system (namely, the first network device), where the Class A & absolute intent information includes an intent identifier, information about intent operation objects, and a total intent target value.

The total intent target value is a fixed value. For example, it is to be ensured that an average throughput rate of the intent operation objects is greater than 10 Mbps.

Step 702: The current intent system determines, based on the Class A & absolute intent information, that the intent operation objects are managed by a plurality of low-level intent systems, and the current intent system decomposes the intent to ensure that first sub-intent target values obtained through decomposition satisfy the total intent target value.

Specifically, the current intent system may decompose the intent according to a specific policy or based on a specific historical situation.

For example, to ensure that an end-to-end packet loss rate of a voice over long term evolution (Voice over Long Term Evolution, VoLTE) service is less than 1%, different packet loss rate intents need to be delivered to intent operation objects, to ensure that a product of packet loss rates of the intent operation objects is less than 1%, and finally achieve an intent of the end-to-end packet loss rate.

Step 703: The current intent system sends a corresponding first sub-intent target value 1 to a low-level intent system 1.

Step 704: The current intent system sends a corresponding first sub-intent target value 2 to a low-level intent system 2.

Step 705: The current intent system sends a corresponding first sub-intent target value n to a low-level intent system n, where n is a quantity of low-level intent systems.

Step 706: The low-level intent system 1 delivers a first instruction to a subordinate intent operation object (namely, the fifth network device) based on the first sub-intent target value 1, and collects state information of the intent operation object. If the first sub-intent target value 1 is not achieved, the low-level intent system 1 sends an intent notification intentNotify message to the current intent system, where the intentNotify message includes information indicating that the first sub-intent target value 1 is not satisfied (for example, unfulfilled), and a first measurement value of the low-level intent system 1, for example, a measurement value that can be achieved achievedValue_1.

The intent operation object is not shown in FIG. 7. The first measurement value is determined based on the state information of the intent operation object.

If the first sub-intent target value 1 is achieved, the low-level intent system 1 sends an intentNotify message to the current intent system, where the intentNotify message includes information indicating that the first sub-intent target value 1 is satisfied.

Step 707: The low-level intent system 2 delivers a first instruction to a subordinate intent operation object based on the first sub-intent target value 2, and collects state information of the intent operation object. If the first sub-intent target value 2 is achieved, the low-level intent system 2 sends an intentNotify message to the current intent system, where the intentNotify message includes information indicating that the first sub-intent target value 2 is satisfied (for example, fulfilled).

The intent operation object is not shown in FIG. 7.

If the first sub-intent target 2 is not achieved, the low-level intent system 2 sends an intentNotify message to the current intent system, where the intentNotify message includes information indicating that the first sub-intent target value 2 is not satisfied, and a first measurement value achievedValue_2 of the low-level intent system 2.

Step 708: The low-level intent system n may perform an operation with reference to step 706 or step 707.

If the first sub-intent target value n is not achieved, the low-level intent system n sends an intentNotify message to the current intent system, where the intentNotify message includes information indicating that the first sub-intent target value n is not satisfied, and a first measurement value of the low-level intent system n, for example, achievedValue_n.

If the first sub-intent target value n is achieved, the low-level intent system n sends an intentNotify message to the current intent system, where the intentNotify message includes information indicating that the first sub-intent target value n is satisfied.

Step 709: Depending on a first message and/or a second message received in step 707 and step 708, if the first message is received, the current intent system re-decomposes the intent.

For a low-level intent system whose first sub-intent target value is not achieved, a new first sub-intent target value allocated to the low-level intent system should not be stricter than a first measurement value reported by the low-level intent system. For a low-level intent system whose first sub-intent target value is achieved, a new first sub-intent target value allocated to the low-level intent system should be stricter than the first sub-intent target value that the low-level intent system has achieved. Finally, it is ensured that all first sub-intent target values obtained through decomposition satisfy the total intent target value.

For step 710 to step 715, refer to step 703 to step 708. Step 709 to step 715 are repeated until all the first sub-intent target values are achieved or no first sub-intent target value is achieved.

Step 716: If all the first sub-intent target values are achieved, the current intent system sends information indicating that the intent is achieved to the high-level intent system. Specifically, the current intent system feeds back an intentNotify message to the high-level intent system, where the intentNotify message includes fulfilled.

Step 717: If no first sub-intent target value is achieved, the current intent system sends information indicating that the intent is not achieved to the low-level intent system, and reports a measurement value that currently can be achieved by the low-level intent system, for example, achievedValue. Specifically, the current intent system feeds back an intentNotify message to the high-level intent system, where the intentNotify message includes unfulfilled.

Optionally, each network device repeats step 701 to step 717 until the Class A & absolute intent is removed.

According to the solution provided in this embodiment of this application, intent decomposition negotiation is performed in the foregoing procedure, to ensure a success rate of intent execution. In addition, implementation details at a bottom level are shielded, and intent execution efficiency is ensured.

Figure 8:
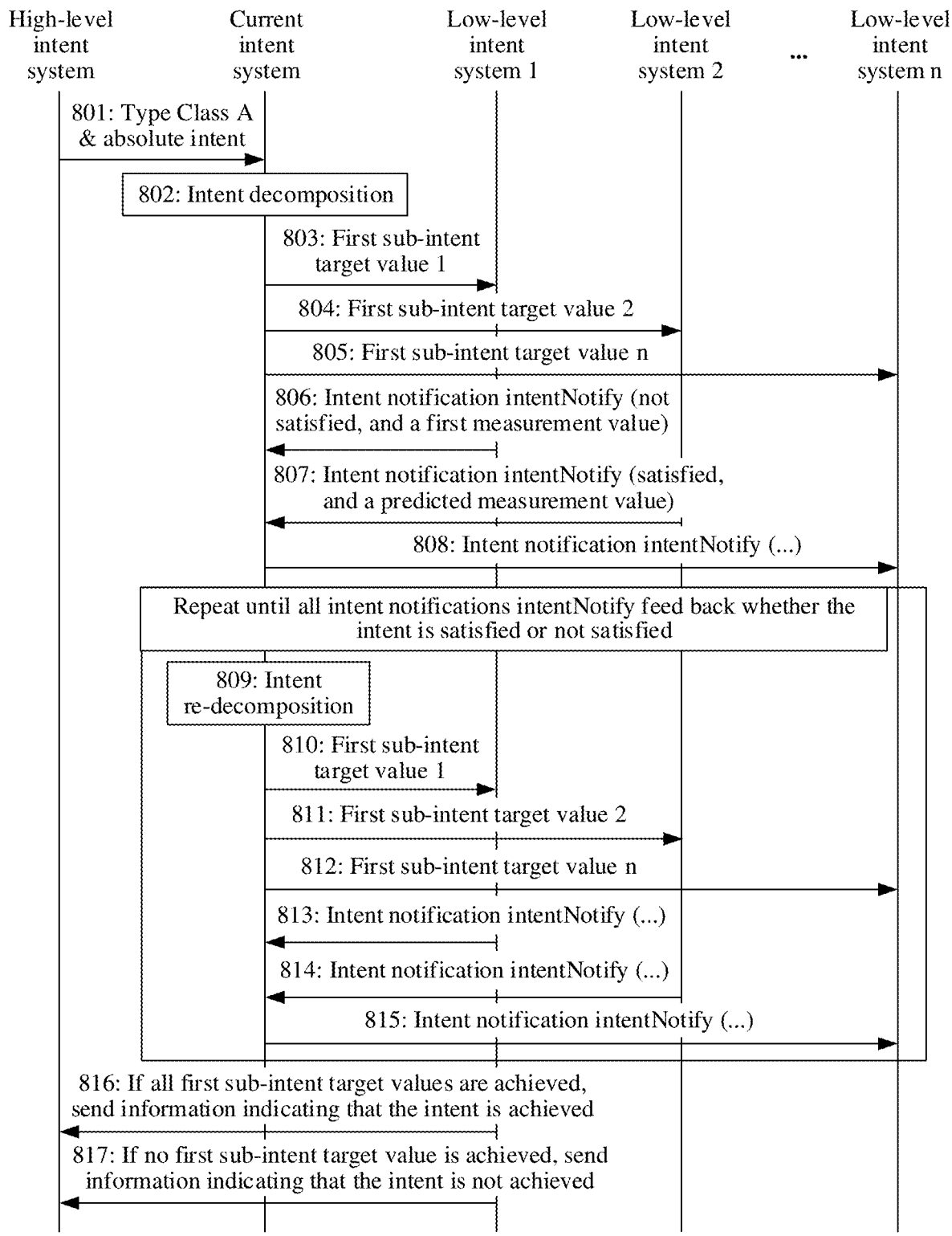
FIG. 8 is a schematic diagram of an intent decomposition procedure according to this application.

Based on FIG. 5 and FIG. 6, this embodiment of this application describes in detail a specific intent decomposition process. Refer to FIG. 8. In this embodiment of this application, the total intent target value is related to the first sub-intent target value, and the total intent target value and the first sub-intent target value are absolute values. In addition, a low-level intent system in this embodiment of this application has a function of predicting a measurement value that can be achieved. Specifically, the following steps are included.

For an execution process of step 801 to step 806, refer to step 701 to step 706.

Step 807: The low-level intent system 2 delivers a first instruction to an intent operation object based on the first sub-intent target value 2, and collects state information of the intent operation object. If the first sub-intent target value 2 is achieved, the low-level intent system 2 sends an intentNotify message to the current intent system, where the intentNotify message includes information indicating that the first sub-intent target value is satisfied and a measurement value obtained through prediction based on the state information of the intent operation object, for example, predictValue_2.

The intent operation object is not shown in FIG. 8.

Step 808: The low-level intent system n may perform an operation with reference to step 706 or step 707.

If the first sub-intent target value n is not achieved, the low-level intent system n sends an intentNotify message to the current intent system, where the intentNotify message includes information indicating that the first sub-intent target value n is not satisfied, and a first measurement value of the low-level intent system n, for example, achievedValue_n.

If the first sub-intent target value n is achieved, the low-level intent system n sends an intentNotify message to the current intent system, where the intentNotify message includes information indicating that the first sub-intent target value n is satisfied and a measurement value obtained through prediction based on the state information of the intent operation object, for example, predictValue_n.

Step 809: Depending on a first message and/or a second message received in step 807 and step 808, if the first message is received, the current intent system re-decomposes the intent.

For a low-level intent system whose first sub-intent target value is not achieved, a new first sub-intent target value allocated to the low-level intent system should not be stricter than a first measurement value reported by the low-level intent system. For a low-level intent system whose first sub-intent target value is achieved, a new first sub-intent target value allocated to the low-level intent system should be stricter than the first sub-intent target value that the low-level intent system has achieved, and should not be stricter than the measurement value obtained through prediction. Finally, it is ensured that all first sub-intent target values obtained through decomposition satisfy the total intent target value.

For step 810 to step 815, refer to step 803 to step 808.

For an execution process of step 816 and step 817, refer to step 716 and step 717.

Optionally, each network device repeats step 801 to step 817 until the Class A & absolute intent is removed.

According to the solution provided in this embodiment of this application, intent decomposition negotiation is performed in the foregoing procedure, to ensure a success rate of intent execution. In addition, implementation details at a bottom level are shielded, and intent execution efficiency is ensured. In addition, because the low-level intent system has a prediction function, a quantity of intent decomposition and negotiation times can be effectively reduced, a convergence time is reduced, and efficiency is improved.

It may be understood that an improvement of FIG. 8 relative to FIG. 7 may also be applied to the following embodiments, and details are not described herein again.

Figure 9:
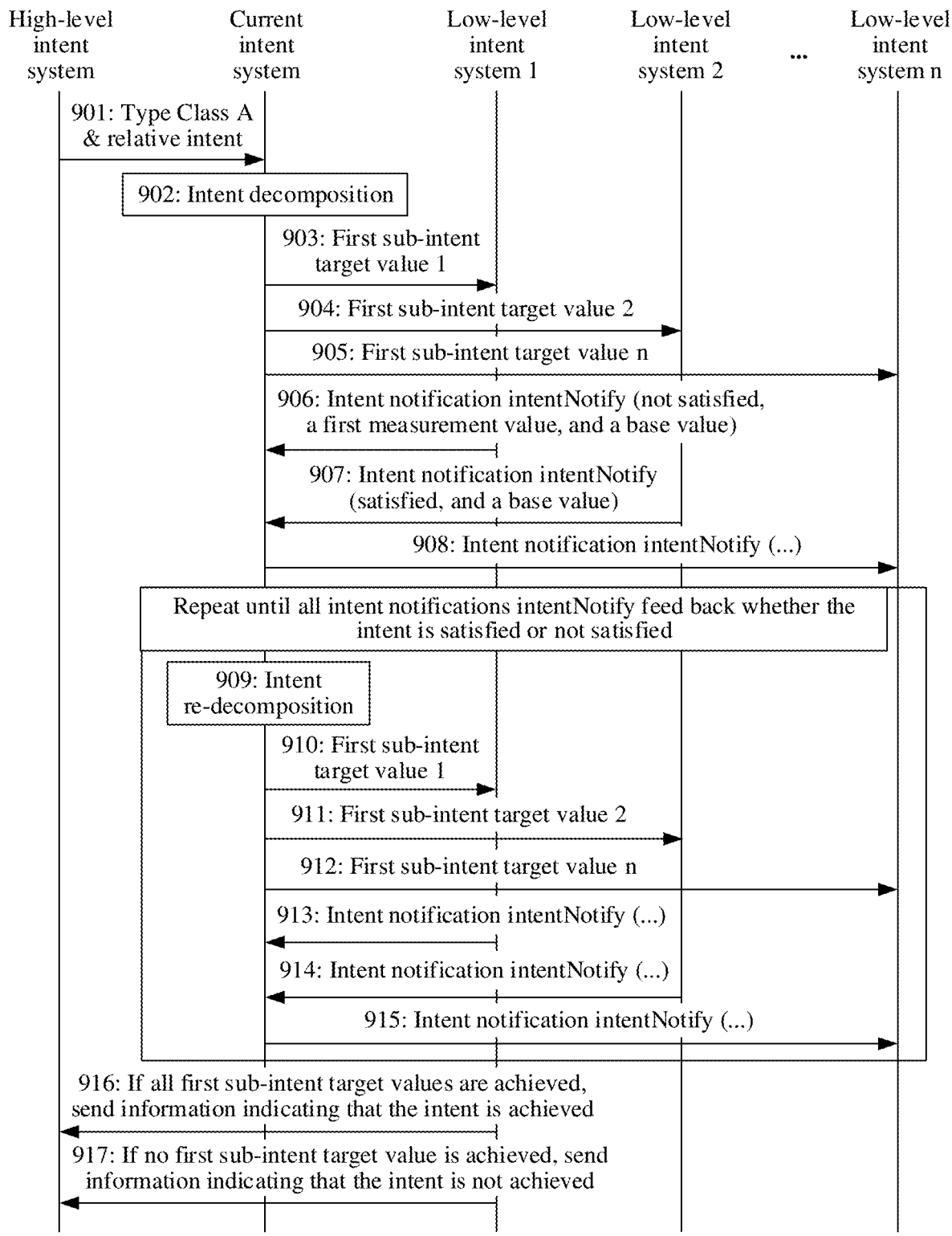
FIG. 9 is a schematic diagram of an intent decomposition procedure according to this application.

Based on FIG. 5 and FIG. 6, this embodiment of this application describes in detail a specific intent decomposition process. Refer to FIG. 9. In this embodiment of this application, the total intent target value is related to the first sub-intent target value, and the total intent target value and the first sub-intent target value are relative values. This is referred to as a Class A & relative intent for short in this embodiment of this application. Specifically, the following steps are included.

Step 901: A high-level intent system sends Class A & relative intent information to a current intent system, where the Class A & relative intent information includes an intent identifier, information about intent operation objects, and a total intent target value.

The overall intent target value is a relative value. For example, an end-to-end delay of a service of a gold subscriber is to be reduced by 20%.

Step 902: The current intent system determines, based on the Class A & relative intent information, that the intent operation objects are managed by a plurality of low-level intent systems, and the current intent system decomposes the intent, for example, may directly deliver a same indicator during decomposition.

For example, to reduce the end-to-end delay of the gold subscriber by 20%, the current intent system may deliver, to all intent operation objects, a same intent of reducing the delay by 20%, to achieve the intent of the end-to-end delay.

For an execution process of step 903 to step 905, refer to step 703 to step 705.

Step 906: The low-level intent system 1 delivers a first instruction to a subordinate intent operation object (namely, the fifth network device) based on the first sub-intent target value 1, and collects state information of the intent operation object. If the first sub-intent target value 1 is not achieved, the low-level intent system 1 sends an intentNotify message to the current intent system, where the intentNotify message includes information indicating that the first sub-intent target value 1 is not satisfied, a first measurement value of the low-level intent system 1, and a base value before the first instruction is executed, for example, baseValue_1.

For example, when an access network device receives the intent of reducing the delay of the service of the gold subscriber by 20%, a corresponding measurement value is 2 ms. After a series of operations, the delay is reduced to 1.8 ms. In this case, the intent is not satisfied, and a measured value that has been reached, namely, 10% or 1.8 ms, and a base value, namely, 2 ms, need to be fed back.

Step 907: The low-level intent system 2 delivers a first instruction to an intent operation object based on the first sub-intent target value 2, and collects state information of the intent operation object. If the first sub-intent target value 2 is achieved, the low-level intent system 2 sends an intentNotify message to the current intent system, where the intentNotify message includes information indicating that the first sub-intent target value 2 is satisfied and a base value before the first instruction is executed, for example, baseValue_2.

Step 908: The low-level intent system n may perform an operation with reference to step 906 or step 907.

Step 909: Depending on a first message and/or a second message received in step 907 and step 908, if the first message is received, the current intent system re-decomposes the intent.

For a low-level intent system whose first sub-intent target value is not achieved, a new first sub-intent target value allocated to the low-level intent system should not be stricter than a first measurement value reported by the low-level intent system. For a low-level intent system whose first sub-intent target value is achieved, a new first sub-intent target value allocated to the low-level intent system should be stricter than the first sub-intent target value that the low-level intent system has achieved. Finally, based on the base values fed back by the low-level intent systems, it is ensured that all first sub-intent target values obtained through decomposition satisfy the total intent target value.

For an execution process of step 910 to step 917, refer to step 710 to step 717.

Optionally, each network device repeats step 901 to step 917 until the Class A & relative intent is removed.

According to the solution provided in this embodiment of this application, intent decomposition negotiation is performed in the foregoing procedure, to ensure a success rate of intent execution. In addition, implementation details at a bottom level are shielded, and intent execution efficiency is ensured.

Figure 10:
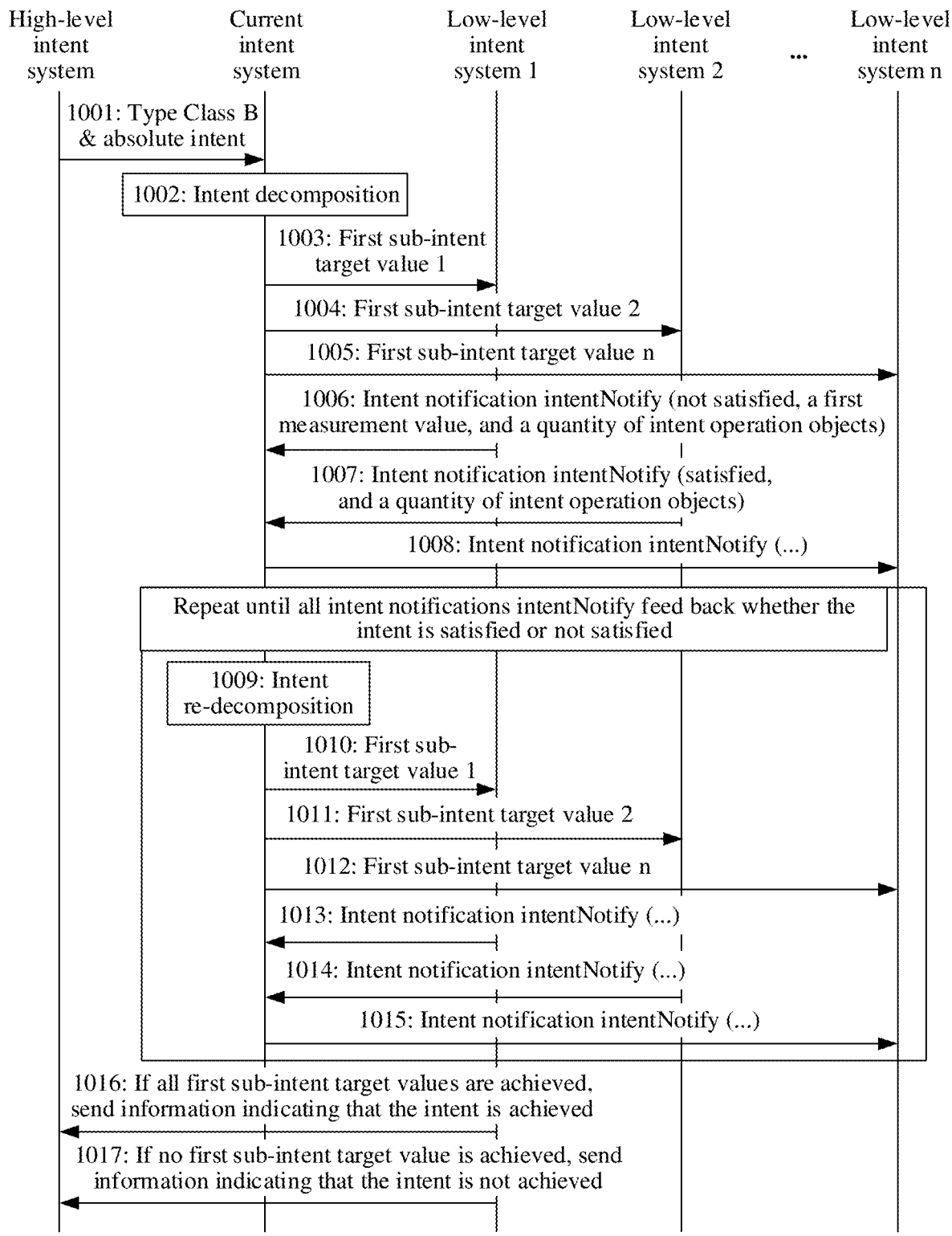
FIG. 10 is a schematic diagram of an intent decomposition procedure according to this application.

Based on FIG. 5 and FIG. 6, this embodiment of this application describes in detail a specific intent decomposition process. Refer to FIG. 10. In this embodiment of this application, the total intent target value is related to the first sub-intent target value and the quantity of the intent operation objects, and the total intent target value and the first sub-intent target value are absolute values. This is referred to as a Class B & absolute intent for short in this embodiment of this application. Specifically, the following steps are included.

Step 1001: A high-level intent system sends Class B & absolute intent information to a current intent system, where the Class B & absolute intent information includes an intent identifier, information about intent operation objects, and a total intent target value.

The total intent target value is a fixed value, and is relative to the quantity of the intent operation objects.

Step 1002: The current intent system determines, based on the Class B & absolute intent information, that the intent operation objects are managed by a plurality of low-level intent systems, the current intent system decomposes the intent, and may directly deliver a same indicator during decomposition.

For example, to ensure that an average throughput rate of the intent operation objects is greater than 10 Mbps, the current intent system send a same first sub-intent target value (for example, an intent of ensuring that the average throughput rate of the intent operation objects is greater than 10 Mbps) to different low-level intent systems that manage the intent operation objects, to finally achieve the intent of the end-to-end throughput rate.

For an execution process of step 1003 to step 1005, refer to step 703 to step 705.

Step 1006: The low-level intent system 1 delivers a first instruction to a subordinate intent operation object based on the first sub-intent target value 1, and collects state information of the intent operation object. If the first sub-intent target value 1 is not achieved, the low-level intent system 1 sends an intentNotify message to the current intent system, where the intentNotify message includes information indicating that the first sub-intent target value is not satisfied, a first measurement value of the low-level intent system 1, and the quantity of the intent operation objects, for example, objectNum_1.

For example, when a low-level intent system receives a first sub-intent target value (that is, an intent of ensuring that an average throughput rate of intent operation objects is greater than 10 Mbps), after the first instruction is sent to the intent operation object, a final average throughput rate of the intent operation object is 8 Mbps. In this case, the first sub-intent target value is not satisfied, and a measured value that has been reached, namely, 8 Mbps, and the current quantity of the intent operation objects need to be fed back.

Step 1007: The low-level intent system 2 delivers a first instruction to a subordinate intent operation object based on the first sub-intent target value 2, and collects state information of the intent operation object. If the first sub-intent target value 2 is achieved, the low-level intent system 2 sends an intentNotify message to the current intent system, where the intentNotify message includes information indicating that the first sub-intent target value 2 is satisfied and the quantity of the intent operation objects, for example, objectNum_2.

Step 1008: The low-level intent system n may perform an operation with reference to step 1006 or step 1007.

Step 1009: Depending on a first message and/or a second message received in step 1007 and step 1008, if the first message is received, the current intent system re-decomposes the intent.

For a low-level intent system whose first sub-intent target value is not achieved, a new first sub-intent target value allocated to the low-level intent system should not be stricter than a first measurement value reported by the low-level intent system. For a low-level intent system whose first sub-intent target value is achieved, a new first sub-intent target value allocated to the low-level intent system should be stricter than the first sub-intent target value that the low-level intent system has achieved. Finally, based on the quantity of the intent operation objects fed back by the low-level intent systems, it is ensured that all first sub-intent target values obtained through decomposition satisfy the total intent target value.

For an execution process of step 1010 to step 1017, refer to step 710 to step 717.

Optionally, each network device repeats step 1001 to step 1017 until the Class B & absolute intent is removed.

According to the solution provided in this embodiment of this application, intent decomposition negotiation is performed in the foregoing procedure, to ensure a success rate of intent execution. In addition, implementation details at a bottom level are shielded, and intent execution efficiency is ensured.

Figure 11:
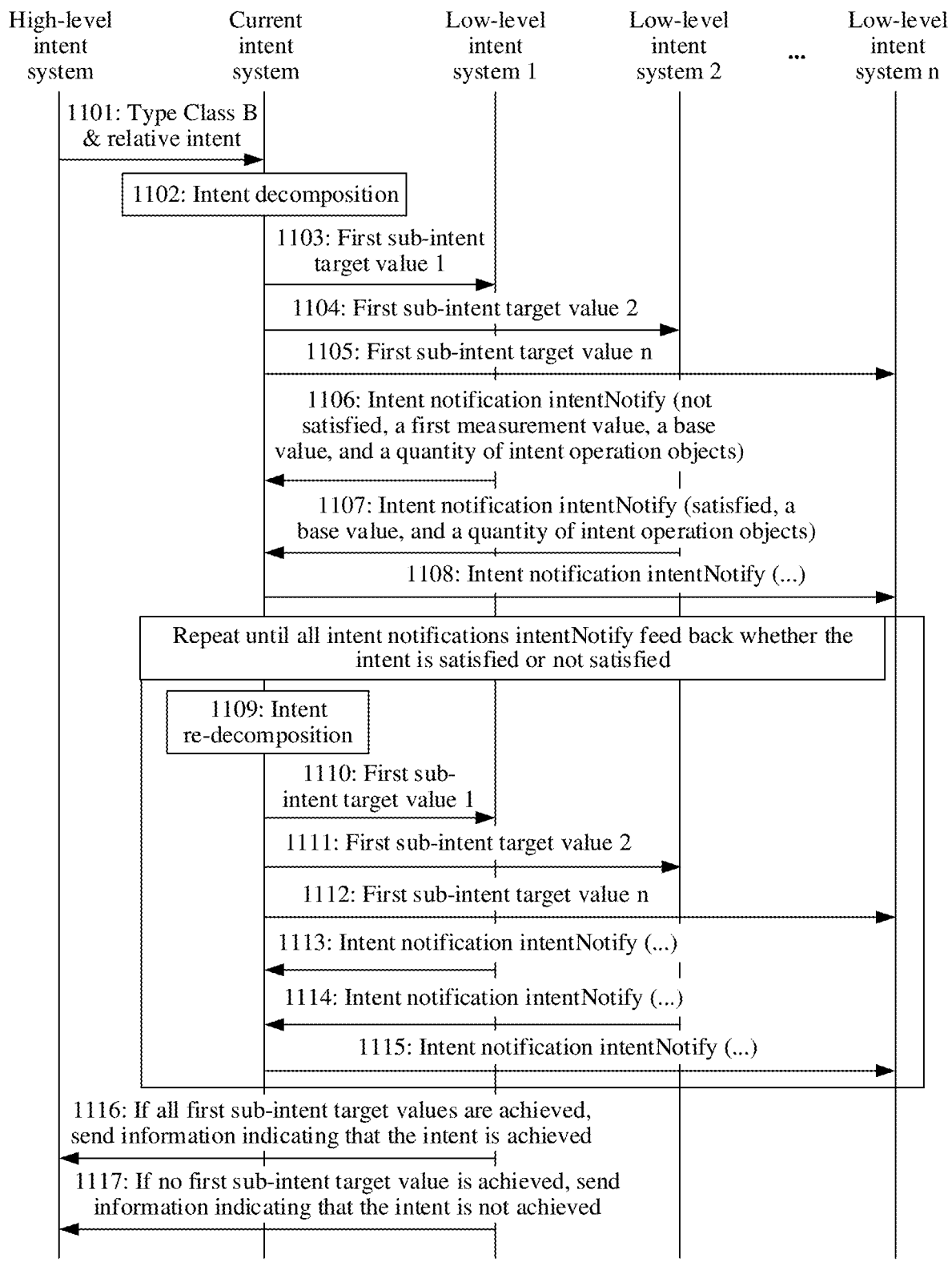
FIG. 11 is a schematic diagram of an intent decomposition procedure according to this application.

Based on FIG. 5 and FIG. 6, this embodiment of this application describes in detail a specific intent decomposition process. Refer to FIG. 11. In this embodiment of this application, the total intent target value is related to the first sub-intent target value and the quantity of the intent operation objects, and the total intent target value and the first sub-intent target value are relative values. This is referred to as a Class B & relative intent for short in this embodiment of this application. Specifically, the following steps are included.

Step 1101: A high-level intent system sends Class B & relative intent information to a current intent system, where the Class B & relative intent information includes an intent identifier, information about intent operation objects, and a total intent target value.

The total intent target value is a relative value, and is relative to the quantity of the intent operation objects.

Step 1102: The current intent system determines, based on the Class B & relative intent information, that the intent operation objects are managed by a plurality of low-level intent systems, and the current intent system decomposes the intent, for example, may directly deliver a same indicator during decomposition.

For example, to increase an average throughput rate of the intent operation objects by 20%, the current intent system may deliver a same first sub-intent target value (for example, an intent of ensuring that the average throughput rate of the intent operation objects is greater than 10 Mbps) to low-level intent systems, to finally achieve the intent of the end-to-end throughput rate.

For an execution process of step 1103 to step 1105, refer to step 703 to step 705.

Step 1106: The low-level intent system 1 delivers a first instruction to an intent operation object based on the first sub-intent target value 1, and collects state information of the intent operation object. If the first sub-intent target value 1 is not achieved, the low-level intent system 1 sends an intentNotify message to the current intent system, where the intentNotify message includes information indicating that the first sub-intent target value 1 is not satisfied, a first measurement value of the low-level intent system 1, a base value before the first instruction is executed, and a quantity of intent operation objects.

For example, for an intent of increasing the average throughput rate of the intent operation objects by 20%, a corresponding measurement value is 10 Mbps. After a series of operations, the average throughput rate is increased to 11 Mbps. In this case, the intent is not satisfied, and a measurement value that has been reached, namely, 10% or 11 Mbps, a base value, namely, 10 Mbps, and a current quantity of intent operation objects need to be fed back.

Step 1107: The low-level intent system 2 delivers a first instruction to an intent operation object based on the first sub-intent target value 2, and collects state information of the intent operation object. If the first sub-intent target value 2 is achieved, the low-level intent system 2 sends an intentNotify message to the current intent system, where the intentNotify message includes information indicating that the first sub-intent target value is satisfied, a base value before the first instruction is executed, and the current quantity of the intent operation objects.

Step 1108: A low-level intent system 3 may perform an operation with reference to step 1106 or step 1107.

Step 1109: Depending on a first message and/or a second message received in step 1107 and step 1108, if the first message is received, the current intent system re-decomposes the intent.

For a low-level intent system whose first sub-intent target value is not achieved, a new first sub-intent target value allocated to the low-level intent system should not be stricter than a first measurement value reported by the low-level intent system. For a low-level intent system whose first sub-intent target value is achieved, a new first sub-intent target value allocated to the low-level intent system should be stricter than the first sub-intent target value that the low-level intent system has achieved. Finally, based on the base value and the current quantity of the intent operation objects that are fed back by the low-level intent systems, it is ensured that all first sub-intent target values obtained through decomposition satisfy the total intent target value.

For an execution process of step 1110 to step 1117, refer to step 710 to step 717.

Optionally, each network device repeats step 1101 to step 1117 until the Class B & relative intent is removed. According to the solution provided in this embodiment of this application, intent decomposition negotiation is performed in the foregoing procedure, to ensure a success rate of intent execution. In addition, implementation details at a bottom level are shielded, and intent execution efficiency is ensured.

Figure 12:
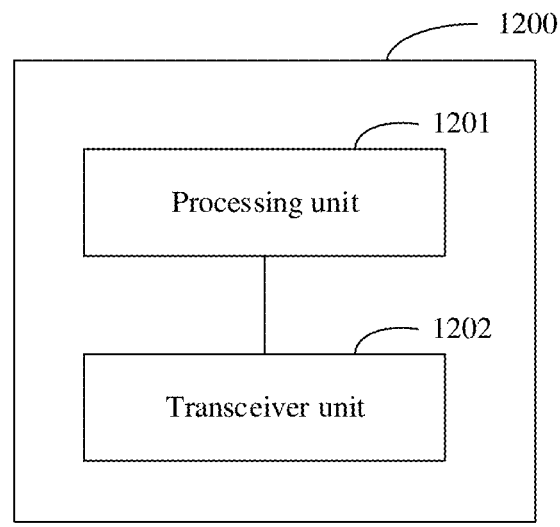
FIG. 12 is a schematic diagram of an apparatus structure of intent decomposition according to this application.

The foregoing describes in detail the intent decomposition method in embodiments of this application with reference to FIG. 1, FIG. 2, and FIG. 5 to FIG. 11. Based on a same inventive concept as the intent decomposition method, an embodiment of this application further provides a communication apparatus. As shown in FIG. 12, the communication apparatus includes a processing unit 1201 and a transceiver unit 1202. The apparatus 1200 may be configured to perform the method described in the method embodiments applied to the network device.

In an embodiment, the apparatus 1200 is applied to a first network device.

Specifically, the transceiver unit 1202 is configured to: send a first sub-intent target value; and receive a first message from a second network device, where the first message is used to indicate that a first sub-intent target value is not achieved, and the first message includes a first measurement value of the second network device.

The processing unit 1201 is configured to: re-decompose an intent based on the first measurement value, and send first sub-intent target values obtained through re-decomposition, until all the first sub-intent target values are achieved or no first sub-intent target value is achieved.

In an implementation, the transceiver unit 1202 is further configured to receive a total intent target value configured by a third network device.

The processing unit 1201 is further configured to decompose the total intent target value to obtain one or more first sub-intent target values.

In an implementation, the transceiver unit 1202 is further configured to receive a second sub-intent target value sent by a third network device, where the second sub-intent target value is obtained by decomposing a total intent target value.

The processing unit 1201 is further configured to decompose the second sub-intent target value to obtain one or more first sub-intent target values.

In an implementation, the transceiver unit 1202 is further configured to receive a second message from a fourth network device, where the second message is used to indicate that a first sub-intent target value corresponding to the fourth network device is achieved.

In an implementation, the total intent target value is related to the first sub-intent target value and/or is related to a quantity of fifth network devices, and the fifth network device is a network device configured to perform an intent operation.

In an implementation, the total intent target value and the first sub-intent target value are absolute values or relative values, the absolute value is not related to state information of the fifth network device, and the relative value is related to the state information of the fifth network device.

In an implementation, the second message includes a second measurement value of the fourth network device, and the second measurement value is obtained through prediction based on the state information of the fifth network device corresponding to the fourth network device.

The processing unit 1201 is specifically configured to re-decompose the intent based on the first measurement value and the second measurement value.

In an implementation, the total intent target value is related to the quantity of the fifth network devices, and the first message and/or the second message further includes the quantity of the fifth network devices.

The processing unit 1201 is specifically configured to re-decompose the intent based on the first measurement value and the quantity of the fifth network devices.

In an implementation, the total intent target value and the first sub-intent target value are relative values, and the first message and/or the second message further include/includes a third measurement value that is of the fifth network device before the fifth network device executes the first instruction.

The processing unit 1201 is specifically configured to re-decompose the intent based on the first measurement value and the third measurement value.

In an implementation, the transceiver unit 1202 is further configured to: if all the first sub-intent target values are achieved, the first network device sends a third message to the third network device, where the third message is used to indicate that the total intent target value is achieved; or if no first sub-intent target value is achieved, the first network device sends a fourth message to the third network device, where the fourth message is used to indicate that the total intent target value is not achieved, the fourth message includes a fourth measurement value of the first network device, and the fourth measurement value is determined based on the first measurement value of the second network device.

In an implementation, the third message includes a fifth measurement value of the first network device, and the fifth measurement value is obtained through prediction based on the state information of the fifth network device.

In an implementation, the total intent target value is related to the quantity of the fifth network devices, and the third message and/or the fourth message include/includes the quantity of the fifth network devices.

In an implementation, the total intent target value and the first sub-intent target value are relative values, and the third message and/or the fourth message include/includes the third measurement value that is of the fifth network device before the fifth network device executes the first instruction.

In another embodiment, the apparatus 1200 is applied to a second network device.

Specifically, the processing unit 1201 is configured to: receive a first sub-intent target value through the transceiver unit 1202; send a first instruction to a fifth network device based on the first sub-intent target value, where the fifth network device is a network device configured to perform an intent operation; obtain state information of the fifth network device, where the state information is used to indicate a sixth measurement value that is of the fifth network device and that is related to an intent in a current state; and if the first sub-intent target value is not achieved, send a first message to a first network device, where the first message is used to indicate that the first sub-intent target value is not achieved, the first message includes a first measurement value of the second network device, and the first measurement value is determined based on the sixth measurement value of the fifth network device.

In an implementation, the transceiver unit 1202 is further configured to: if the first sub-intent target value is achieved, send a second message to the first network device, where the second message is used to indicate that the first sub-intent target value is achieved.

In an implementation, the total intent target value is related to the first sub-intent target value and/or is related to a quantity of fifth network devices.

In an implementation, the total intent target value and the first sub-intent target value are absolute values or relative values, the absolute value is not related to state information of the fifth network device, and the relative value is related to the state information of the fifth network device.

In an implementation, the second message includes a second measurement value of the second network device, and the second measurement value is obtained through prediction based on the state information of the fifth network device.

In an implementation, the total intent target value is related to the quantity of the fifth network devices, and the first message and/or the second message further includes the quantity of the fifth network devices.

In an implementation, the total intent target value and the first sub-intent target value are relative values, and the first message and/or the second message further include/includes a third measurement value that is of the fifth network device before the fifth network device executes the first instruction.

It should be noted that in embodiments of this application, division into modules is an example, and is merely a logical function division. During actual implementation, there may be another division manner. In addition, functional units in embodiments of this application may be integrated into one processing unit, or may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to a current technology, or all or some of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Figure 13:
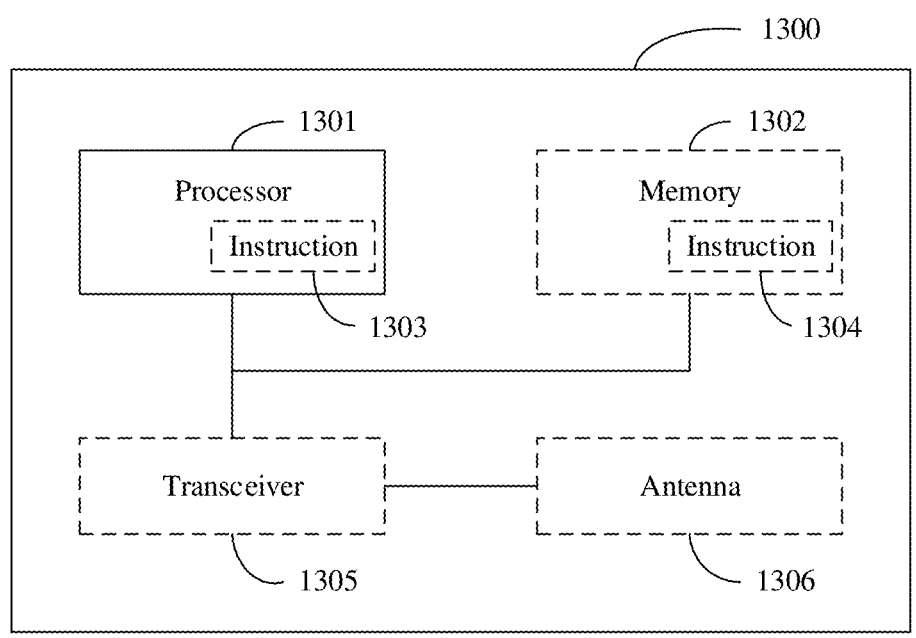
FIG. 13 is a schematic diagram of an apparatus structure of intent decomposition according to this application.

Based on a same concept as the foregoing intent decomposition method, as shown in FIG. 13, an embodiment of this application further provides a schematic diagram of a structure of a communication apparatus 1300. The apparatus 1300 may be configured to implement the method described in the method embodiments of the network device. Refer to the descriptions in the foregoing method embodiments. The network device includes a first network device and/or a second network device. The apparatus 1300 may be in the network device, or may be the network device.

The apparatus 1300 includes one or more processors 1301. The processor 1301 may be a general-purpose processor, a dedicated processor, or the like. For example, the processor 1301 may be a baseband processor or a central processing unit. The baseband processor may be configured to process a communication protocol and communication data. The central processing unit may be configured to: control a communication apparatus (for example, a base station, a terminal, or a chip), execute a software program, and process data of the software program. The communication apparatus may include a transceiver unit, configured to input (receive) and output (send) a signal. For example, the transceiver unit may be a transceiver or a radio frequency chip.

The communication apparatus 1300 includes the one or more processors 1301, and the one or more processors 1301 may implement the method of the network device in the foregoing embodiments.

Optionally, the processor 1301 may further implement another function in addition to the method in the foregoing embodiments.

Optionally, in a design, the processor 1301 may execute instructions, so that the apparatus 1300 performs the method described in the foregoing method embodiments. All or a part of the instructions, for example, an instruction 1303, may be stored in the processor, or all or a part of the instructions, for example, an instruction 1304, may be stored in a memory 1302 coupled to the processor. Alternatively, the apparatus 1300 may be enabled, by using both the instruction 1303 and the instruction 1304, to perform the method described in the foregoing method embodiments.

In another possible design, the communication apparatus 1300 may further include a circuit, and the circuit may implement a function of the network device in the foregoing method embodiments.

In another possible design, the apparatus 1300 may include one or more memories 1302, where the memory 1302 stores an instruction 1304, and the instruction may be run on the processor, so that the apparatus 1300 performs the method described in the foregoing method embodiments. Optionally, the memory may further store data. Optionally, the processor may also store instructions and/or data. For example, the one or more memories 1302 may store the correspondence described in the foregoing embodiments, or the related parameter or table in the foregoing embodiments. The processor and the memory may be separately disposed, or may be integrated together.

In another possible design, the apparatus 1300 may further include a transceiver unit 1305 and an antenna 1306. The processor 1301 may be referred to as a processing unit, and controls an apparatus (a terminal or a base station). The transceiver 1305 may be referred to as a transceiver, a transceiver circuit, a transceiver unit, or the like, and is configured to implement a transceiver function of the apparatus by using the antenna 1306.

It should be noted that, the processor in embodiments of this application may be an integrated circuit chip, and has a signal processing capability. In an implementation process, the steps in the foregoing method embodiments may be completed by using a hardware integrated logic circuit or instructions in a form of software in the processor. The processor may be a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and the method described in this specification is intended to include, but not limited to, these memories and any memory of another proper type.

An embodiment of this application further provides a computer-readable medium. The computer-readable medium stores a computer program. When the computer program is executed by a computer, the intent decomposition method in any one of the foregoing method embodiments applied to the network device is implemented.

An embodiment of this application further provides a computer program product. When the computer program product is executed by a computer, the intent decomposition method in any one of the foregoing method embodiments applied to the network device is implemented.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (Digital Subscriber Line, DSL)) or wireless (for example, infrared, radio, and microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (Digital Video Disc, DVD)), a semiconductor medium (for example, a solid-state drive (Solid State Disk, SSD)), or the like.

An embodiment of this application further provides a processing apparatus, including a processor and an interface. The processor is configured to perform the intent decomposition method in any one of the foregoing method embodiments applied to the network device.

It should be understood that the processing apparatus may be a chip. The processor may be implemented by hardware, or may be implemented by software. When the processor is implemented by the hardware, the processor may be a logic circuit, an integrated circuit, or the like. When the processor is implemented by the software, the processor may be a general-purpose processor. The general-purpose processor is implemented by reading software code stored in a memory. The memory may be integrated into the processor, or may be located outside the processor and exist independently.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are executed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and unit, refer to a corresponding process in the method embodiment. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in a computer-readable medium. The computer-readable medium includes a computer storage medium and a communication medium, and the communication medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can be used to carry or store expected program code in a form of instructions or a data structure and can be accessed by the computer. In addition, any connection may be properly defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. A disk (Disk) and a disc (disc) used in this application include a compact disc (CD), a laser disc, an optical disc, a digital versatile disc (DVD), a floppy disk, and a Blu-ray disc, where the disk generally copies data in a magnetic manner, and the disc copies data optically in a laser manner. The foregoing combination shall also be included in the protection scope of the computer-readable medium.

In conclusion, the foregoing descriptions are merely examples of embodiments of the technical solutions of this application, but are not intended to limit the protection scope of this application. Any modification, equivalent replacement, or improvement made without departing from the spirit and principle of this application shall fall within the protection scope of this application.

What is claimed is:

1. An intent decomposition method, comprising:
   sending, by a first network device, a first sub-intent target value to a second network device;
   receiving, by the first network device, a first message from the second network device, wherein the first message is used to indicate that the first sub-intent target value sent to the second network device is not achieved by the second device and the first message comprises a first measurement value of the second network device; and
   re-decomposing, by the first network device, an intent based on the first measurement value, and sending first sub-intent target values obtained through re-decomposition to the second network device and one or more other network devices different from the first network device and the second network device until all the first sub-intent target values obtained through re-decomposition are achieved by the second network device and the one or more other network devices or none of the first sub-intent target values obtained through re-decomposition are achieved by the second network device and the one or more other network devices.

2. The intent decomposition method according to claim 1, wherein before the sending, by the first network device, the first sub-intent target value to the second network device, the method further comprises:
   receiving, by the first network device, a total intent target value configured by a third network device different from the second network device and the one or more other network devices; and
   decomposing, by the first network device, the total intent target value to obtain the first sub-intent target value sent to the second network device by the first network device.

3. The intent decomposition method according to claim 2, wherein the total intent target value is related to a quantity of execution devices, and each execution device is a network device configured to perform an intent operation.

4. The intent decomposition method according to claim 3, wherein the total intent target value and the first sub-intent target value are absolute values or relative values, the absolute value is not related to state information of the execution device, and the relative value is related to the state information of the execution device.

5. The intent decomposition method according to claim 4, wherein the method further comprises:
   before re-decomposing, by the first network device, the intent based on the first measurement value, the sending, by the first network device, a corresponding first sub-intent target value to the one or more other network devices; and
   receiving, by the first network device, a second message from one of the one or more other network devices, wherein the second message is used to indicate that the first sub-intent target value corresponding to the one of the one or more other network devices is achieved,
   the second message comprises a second measurement value of the one of the one or more other network devices,
   the second measurement value is obtained through prediction based on the state information of one of the execution devices,
   the total intent target value and the first sub-intent target value are relative values,
   at least one of the first message or the second message further comprises a third measurement value that is of the one of the execution devices before the one of the execution devices executes a first instruction, and
   the re-decomposing, by the first network device, the intent based on the first measurement value comprises:
   re-decomposing, by the first network device, the intent based on the first measurement value and the third measurement value.

6. The intent decomposition method according to claim 1, wherein before the sending, by the first network device, the first sub-intent target value to the second network device, the method further comprises:
   receiving, by the first network device, a second sub-intent target value sent by a third network device different from the second network device and the one or more other network devices, wherein the second sub-intent target value is obtained by the third network device by decomposing a total intent target value; and
   decomposing, by the first network device, the second sub-intent target value to obtain the first sub-intent target value sent to the second network device by the first network device.

7. The intent decomposition method according to claim 6, wherein the method further comprises:
in response to all the first sub-intent target values obtained by re-decomposition being achieved, sending, by the first network device, a success message to the third network device, wherein the success message is used to indicate that the total intent target value is achieved; or
in response to none of the first sub-intent target values obtained by re-decomposition being achieved, sending, by the first network device, a failure message to the third network device, wherein the failure message is used to indicate that the total intent target value is not achieved, the failure message comprises a second measurement value of the first network device, and the second measurement value is determined based on the first measurement value of the second network device.

8. The intent decomposition method according to claim 7, wherein the success message comprises a third measurement value of the first network device, and the third measurement value is obtained through prediction based on state information of an execution device configured to perform an intent operation.

9. The intent decomposition method according to claim 8, wherein the execution device is one of multiple execution devices, the total intent target value is related to a quantity of the execution devices, and at least one of the success message or the failure message comprises the quantity of the execution devices.

10. The intent decomposition method according to claim 7, wherein the total intent target value and the first sub-intent target value are relative values, and at least one of the success message or the failure message comprises a third measurement value that is of an execution device before the execution device executes a first instruction.

11. The intent decomposition method according to claim 1, wherein the method further comprises:
before re-decomposing, by the first network device, the intent based on the first measurement value, sending, by the first network device, a corresponding first sub-intent target value to the one or more other network devices; and
receiving, by the first network device, a second message from one of the one or more other network devices, wherein the second message is used to indicate that the first sub-intent target value corresponding to the one of the one or more other network devices is achieved.

12. The intent decomposition method according to claim 11, wherein the second message comprises a second measurement value of the one of the one or more other network devices, the second measurement value is obtained through prediction based on state information of an execution device in communication with the one of the one or more other network devices, and
the re-decomposing, by the first network device, the intent based on the first measurement value comprises:
re-decomposing, by the first network device, the intent based on the first measurement value and the second measurement value.

13. The intent decomposition method according to claim 11, wherein
the total intent target value is related to a quantity of execution devices,
at least one of the first message or the second message further comprises the quantity of the execution devices, and
the re-decomposing, by the first network device, the intent based on the first measurement value comprises:
re-decomposing, by the first network device, the intent based on the first measurement value and the quantity of the execution devices.

14. An intent decomposition method, comprising:
receiving, by a first network device, a first sub-intent target value;
sending, by the first network device, a first instruction to a second network device based on the first sub-intent target value, wherein the second network device is configured to perform an intent operation;
obtaining, by the first network device, state information of the second network device, wherein the state information is used to indicate a first measurement value that is of the second network device and that is related to an intent in a current state; and
in response to the first sub-intent target value not being achieved, sending, by the first network device, a first message to a third network device, wherein the first message is used to indicate that the first sub-intent target value is not achieved, the first message comprises a second measurement value of the first network device, and the second measurement value is determined based on the first measurement value of the second network device.

15. The intent decomposition method according to claim 14, wherein the method further comprises:
in response to the first sub-intent target value being achieved, sending, by the first network device, a second message to the third network device, wherein the second message is used to indicate that the first sub-intent target value is achieved.

16. The intent decomposition method according to claim 15, wherein the second message comprises a second measurement value of the first network device, and the second measurement value is obtained through prediction based on the state information of the second network device.

17. The intent decomposition method according to claim 14, wherein the second network device is one of multiple second network devices, and a total intent target value is related to at least one of the first sub-intent target value or a quantity of the second network devices.

18. The intent decomposition method according to claim 14, wherein the total intent target value and the first sub-intent target value are absolute values or relative values, the absolute value is not related to the state information of the second network device, and the relative value is related to the state information of the second network device.

19. A communication apparatus, comprising a processor and a memory, wherein the processor is coupled to the memory;
the memory is configured to store a computer program; and
the processor is configured to execute the computer program stored in the memory, to implement the intent decomposition method according to claim 1.

20. A communication apparatus, comprising a processor and a memory, wherein the processor is coupled to the memory;
the memory is configured to store a computer program; and
the processor is configured to execute the computer program stored in the memory, to implement the intent decomposition method according to claim 14.

* * * * *